US010366626B2

(12) United States Patent
Hsiao et al.

(10) Patent No.: US 10,366,626 B2
(45) Date of Patent: Jul. 30, 2019

(54) METHOD FOR FACILITATING HANDWRITING PRACTICE AND ELECTRONIC DEVICE FOR IMPLEMENTING THE METHOD

(71) Applicant: National Taiwan Normal University, Taipei (TW)

(72) Inventors: Hsien-Sheng Hsiao, Taipei (TW); Chia-Hou Wu, Taipei (TW); Rong-Long Chang, Taipei (TW); Yu-Kai Chang, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 169 days.

(21) Appl. No.: 15/466,621

(22) Filed: Mar. 22, 2017

(65) Prior Publication Data

US 2018/0040257 A1 Feb. 8, 2018

(30) Foreign Application Priority Data

Aug. 2, 2016 (TW) .............................. 105124395 A

(51) Int. Cl.
*G09B 11/00* (2006.01)
*G09B 11/04* (2006.01)
(Continued)

(52) U.S. Cl.
CPC .............. *G09B 11/04* (2013.01); *G06F 3/018* (2013.01); *G06F 3/04883* (2013.01);
(Continued)

(58) Field of Classification Search
CPC ........... G09B 11/00; G09B 11/04; G06T 3/40; G06F 3/018; G06K 9/222
See application file for complete search history.

(56) References Cited

U.S. PATENT DOCUMENTS 6,275,611 B1 * 8/2001 Parthasarathy ...... G06K 9/4604
382/187
2002/0158850 A1 * 10/2002 Sun ........................ G09B 19/04
345/173

(Continued)

FOREIGN PATENT DOCUMENTS

EP          3206110 A1 *  8/2017   ......... G06K 9/00416

*Primary Examiner* — Peter R Egloff
(74) *Attorney, Agent, or Firm* — Birch, Stewart, Kolasch & Birch, LLP

(57) ABSTRACT

A method for facilitating handwriting practice includes: generating handwriting strokes in response to user input of user-writing strokes; generating an input image that includes the handwriting strokes, and that has a shape similar to a shape of a standard image associated with a standard word character; scaling the input image to generate a scaled image with a size that is the same as a size the standard image; overlapping the standard image and the scaled image; comparing an $n^{th}$ handwriting stroke in the scaled image with an $n^{th}$ standard stroke in a standard order of the standard word character; and when the $n^{th}$ handwriting stroke does not correspond in position to the $n^{th}$ standard stroke, displaying a notification of a stroke order error.

14 Claims, 26 Drawing Sheets

(51) Int. Cl.
  *G06F 3/0488*  (2013.01)
  *G06K 9/22*   (2006.01)
  *G06K 9/34*   (2006.01)
  *G06K 9/62*   (2006.01)
  *G06F 3/01*   (2006.01)
  G06T 3/40    (2006.01)
  G09B 5/02    (2006.01)

(52) U.S. Cl.
  CPC .............. *G06K 9/222* (2013.01); *G06K 9/344* (2013.01); *G06K 9/6215* (2013.01); *G06K 2209/01* (2013.01); *G06T 3/40* (2013.01); *G09B 5/02* (2013.01)

(56) References Cited

U.S. PATENT DOCUMENTS

| | | | | |
|---|---|---|---|---|
| 2002/0160342 A1* | 10/2002 | Castro | .................... | G09B 5/062 434/159 |
| 2012/0070809 A1* | 3/2012 | Chiu | ........................ | G09B 7/02 434/169 |
| 2014/0080104 A1* | 3/2014 | Sato | ........................ | G09B 7/02 434/162 |

* cited by examiner

METHOD FOR FACILITATING HANDWRITING PRACTICE AND ELECTRONIC DEVICE FOR IMPLEMENTING THE METHOD

CROSS-REFERENCE TO RELATED APPLICATION

This application claims priority of Taiwanese Patent Application No. 105124395, filed on Aug. 2, 2016.

FIELD

The disclosure relates to a method for facilitating handwriting practice, and an electronic device for implementing the method.

BACKGROUND

Handwriting practice may be implemented electronically using an electronic device such as a smartphone, a tablet, etc. In practice, a display (e.g., a touch panel) of the electronic device may be configured to display an exemplary word character in alight color. Then, a user may use a finger or a stylus device to simulate writing strokes of the exemplary word character by inputting a number of strokes in imitation of the exemplary word character displayed on the touch panel.

The electronic device may subsequently compose a written word character based on the received strokes, and compare the strokes of the written word character with the exemplary word character, in order to determine whether the written word character is correctly written.

SUMMARY

One object of the disclosure is to provide a method for facilitating handwriting practice.

According to one embodiment of the disclosure, the method is implemented using an electronic device that includes a processor, a data storage, a touch interface and a display unit. The data storage stores at least one standard image that is associated with a standard word character composed by a number of standard strokes and that has a boundary passing through an upmost point, a lowermost point, a leftmost point and a rightmost point of the standard word character. The method includes the steps of:

a) generating, by the touch interface, a plurality of handwriting data sets in response to user input of a number N of user-writing strokes of an intended word character, respectively;

b) generating, by the processor, a number N of handwriting strokes according to the handwriting data sets, respectively, the handwriting strokes composing a handwriting word character;

c) generating, by the processor, an input image that includes the handwriting word character, that has a boundary passing through an upmost point, a lowermost point, a leftmost point and a rightmost point of the handwriting word character, and that has a shape similar to a shape of the standard image stored in the data storage;

d) scaling, by the processor, the input image to a scaled image with a size that is the same as a size the standard image;

e) overlapping, by the processor, the standard image and the scaled image;

f) comparing, by the processor, an $n^{th}$ one of the handwriting strokes in the scaled image with a corresponding one of the standard strokes that has an $n^{th}$ position in a standard order of the standard word character, where n is an integral variable ranging from 1 to N; and g) when any one of the handwriting strokes does not correspond in position to the corresponding one of the standard strokes based on the comparison made in step f), controlling, by the processor, the display unit to display a notification of a stroke order error in the handwriting word character to notify that the user-writing strokes were not inputted in the standard order.

Another object of the disclosure is to provide an electronic device for implementing the above-mentioned method.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
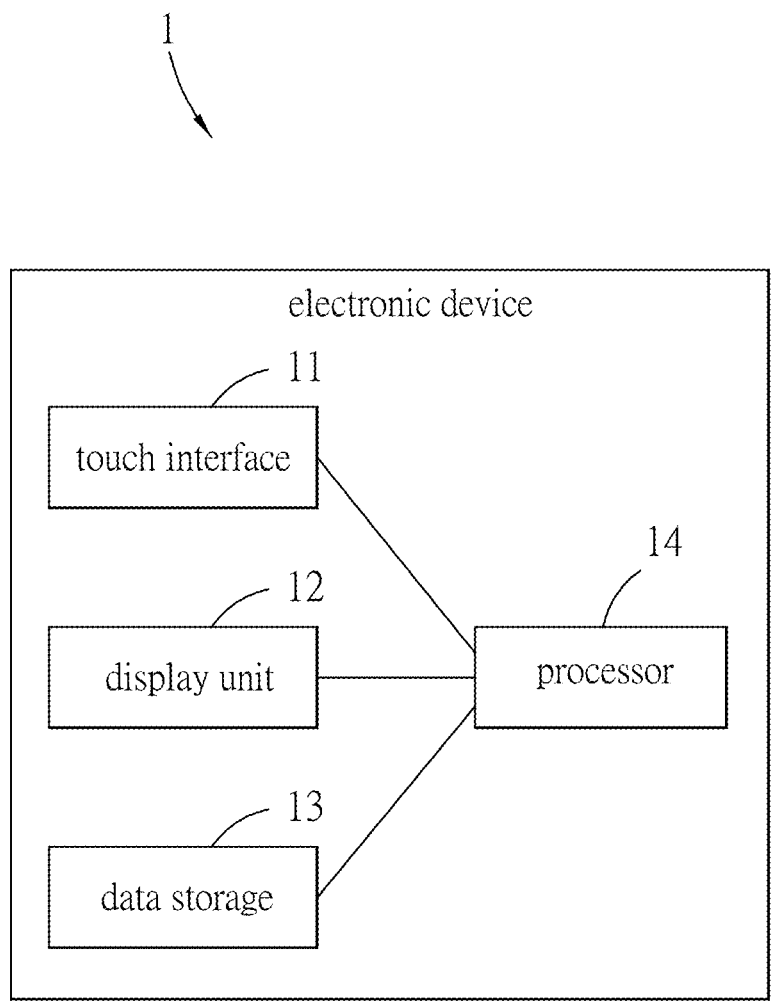
FIG. 1 is a block diagram illustrating an electronic device according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram illustrating an electronic device 1 according to one embodiment of the disclosure. The electronic device includes a touch interface 11, a display unit 12, a data storage 13, and a processor 14 electrically connected to the touch interface 11, the display unit 12 and the data storage 13. The electronic device 1 may be embodied using a smartphone, a laptop, a tablet, a personal computer, etc.

In this embodiment, the electronic device 1 is embodied using a smartphone, the touch interface 11 and display unit 12 are integrated using a touch screen.

Figure 12:
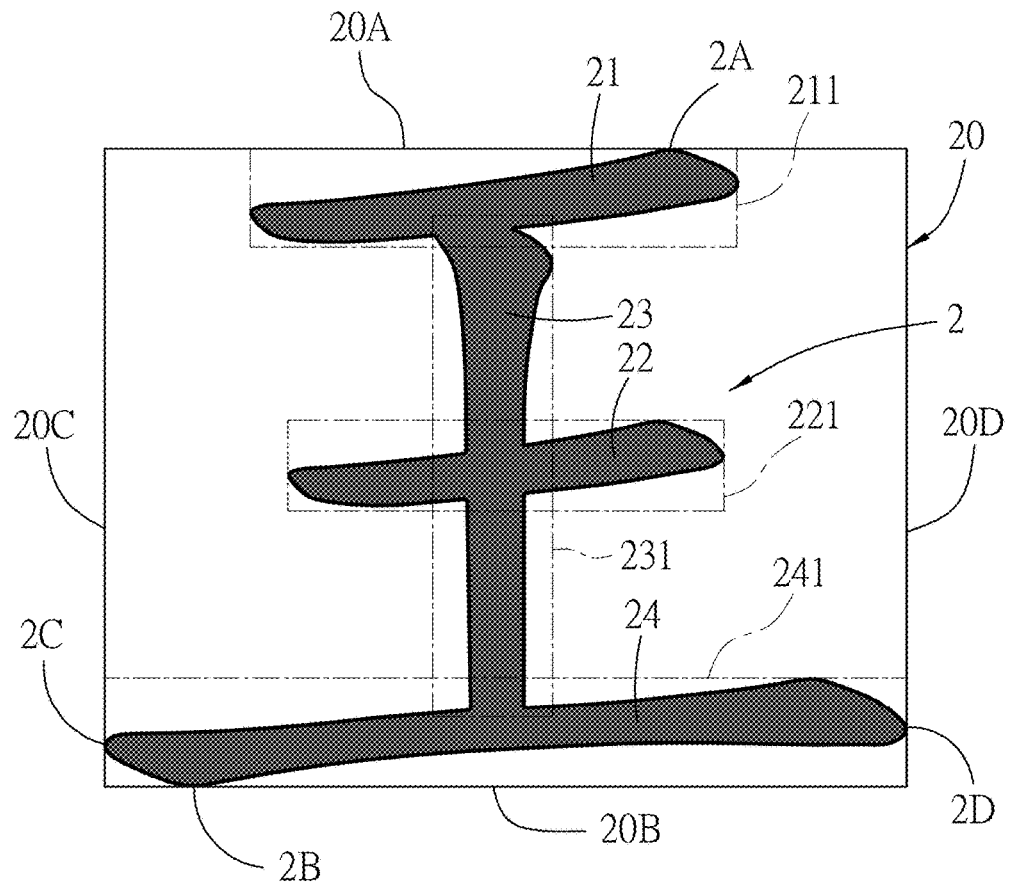
FIG. 12 illustrates a number of acceptance regions being defined.

The data storage 13 may be a physical storage device built in the electronic device 1, and stores a plurality of standard images. Each of the standard images (an example is depicted in FIG. 12 and labeled 20) is associated with a standard word character, and has a boundary passing through an upmost point, a lowermost point, a leftmost point and a rightmost point of the standard word character. In this embodiment, each of the standard images has a rectangular shape, and may be in other shapes, such as a circle, a triangle, etc., in other embodiments.

The standard word character may be a Chinese character, a kanji and a kana in Japanese, or a Hangul and a hanja in Korean, etc.

The standard word character is composed by a number of standard strokes, and has a standard order in which the standard strokes should be written.

Figure 2:
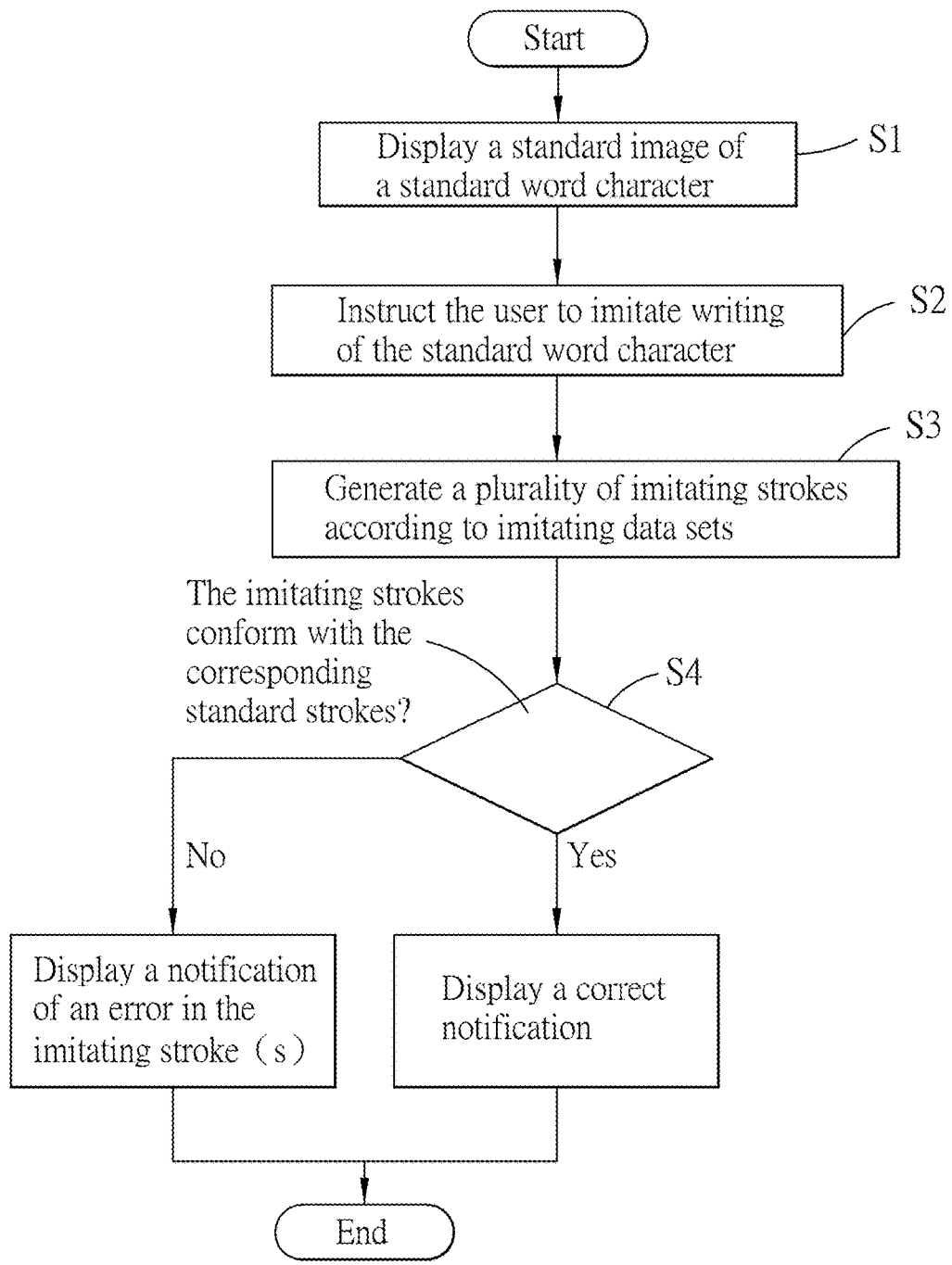
FIG. 2 is a flow chart illustrating steps of a method for facilitating handwriting practice by imitating a standard word character, according to one embodiment of the disclosure.

FIG. 2 is a flow chart illustrating steps of method for facilitating handwriting practice by imitating the standard word character to be implemented by the electronic device 1, according to one embodiment of the disclosure.

Figure 3:
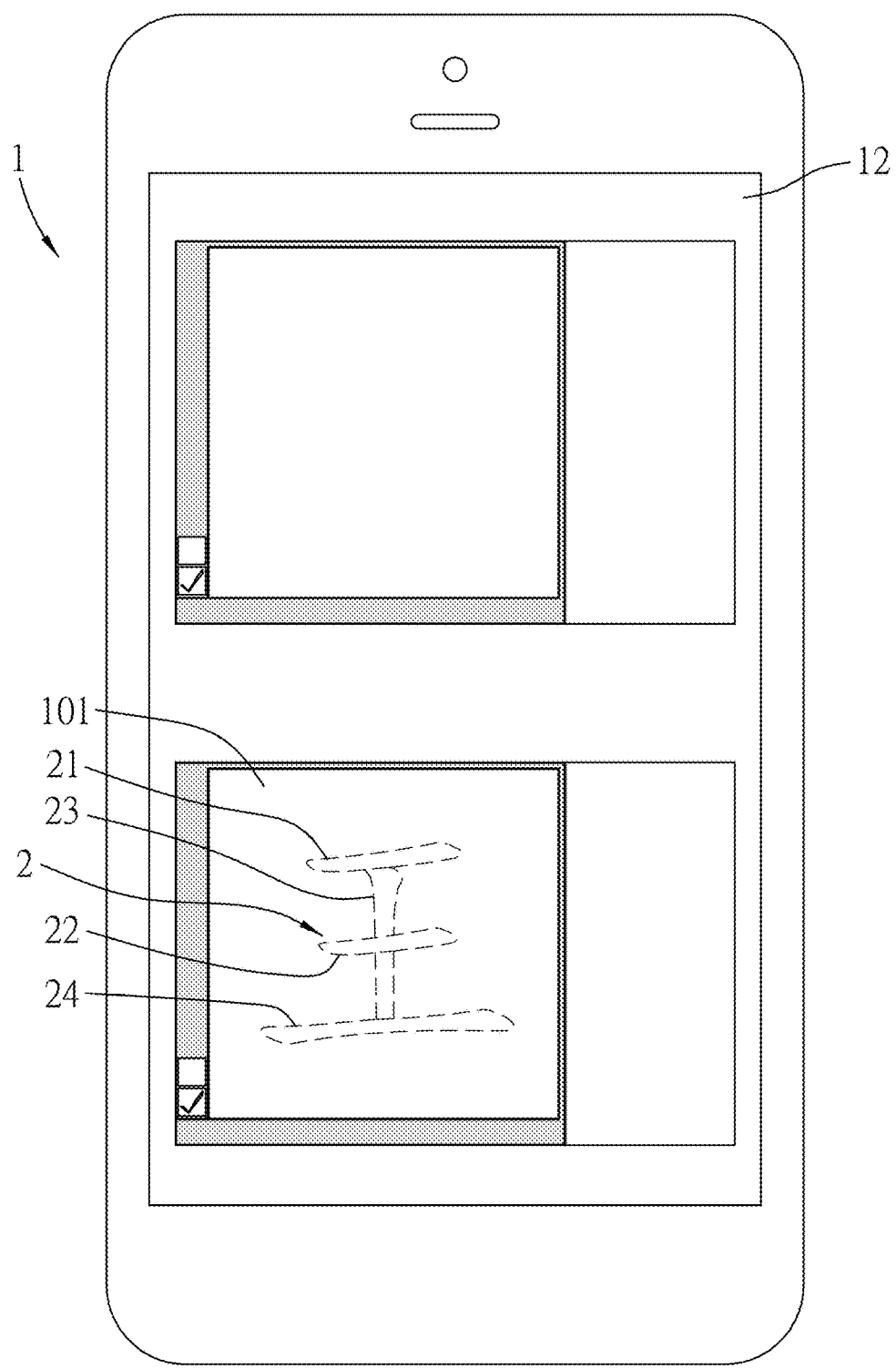
FIG. 3 illustrates a contour of the standard word character in broken lines being displayed.

In step S1, the processor 14 controls the display unit 12 to display one of the standard images in a region 101 as shown in FIG. 3, for instructing a user of the electronic device 1 to imitate the standard word character included in the displayed standard image. The standard image displayed by the display unit 12 may be selected by the user in this embodiment, and may be selected randomly by the processor 14 in other embodiments.

In embodiments of this disclosure, the Chinese character "王" is taken as an exemplary standard word character 2 for implementing the method. This standard character "王" is composed by four standard strokes 21 to 24. It is noted that reference numerals of the standard strokes 21 to 24 are assigned based on the standard order of the standard character "王". For example, the one of standard strokes that should be written first is assigned as a first standard stroke 21.

Figure 4:
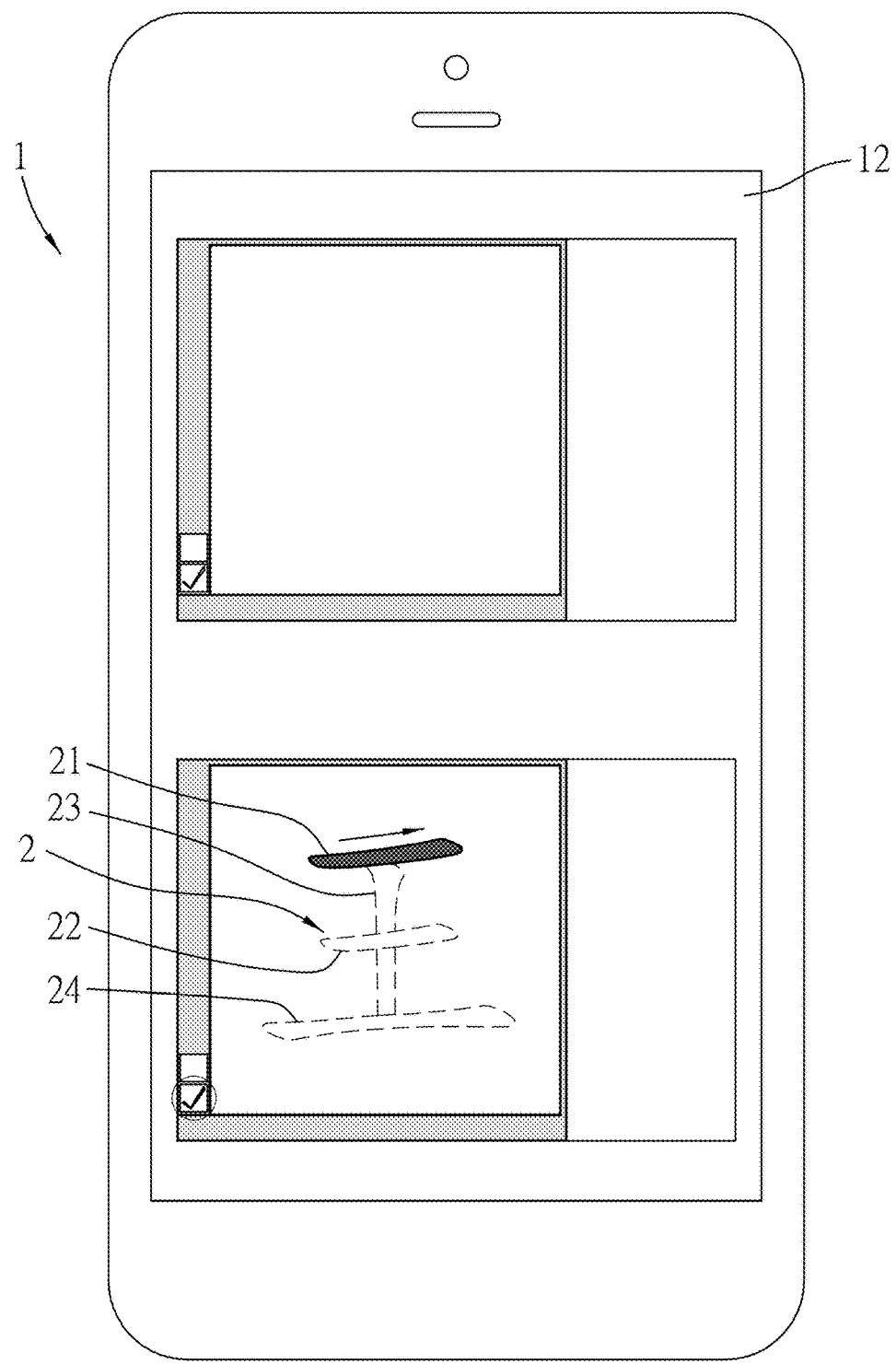
FIGS. 4 to 6 illustrate a standard manner in which standard strokes of the standard word character should be written.
Figure 5:
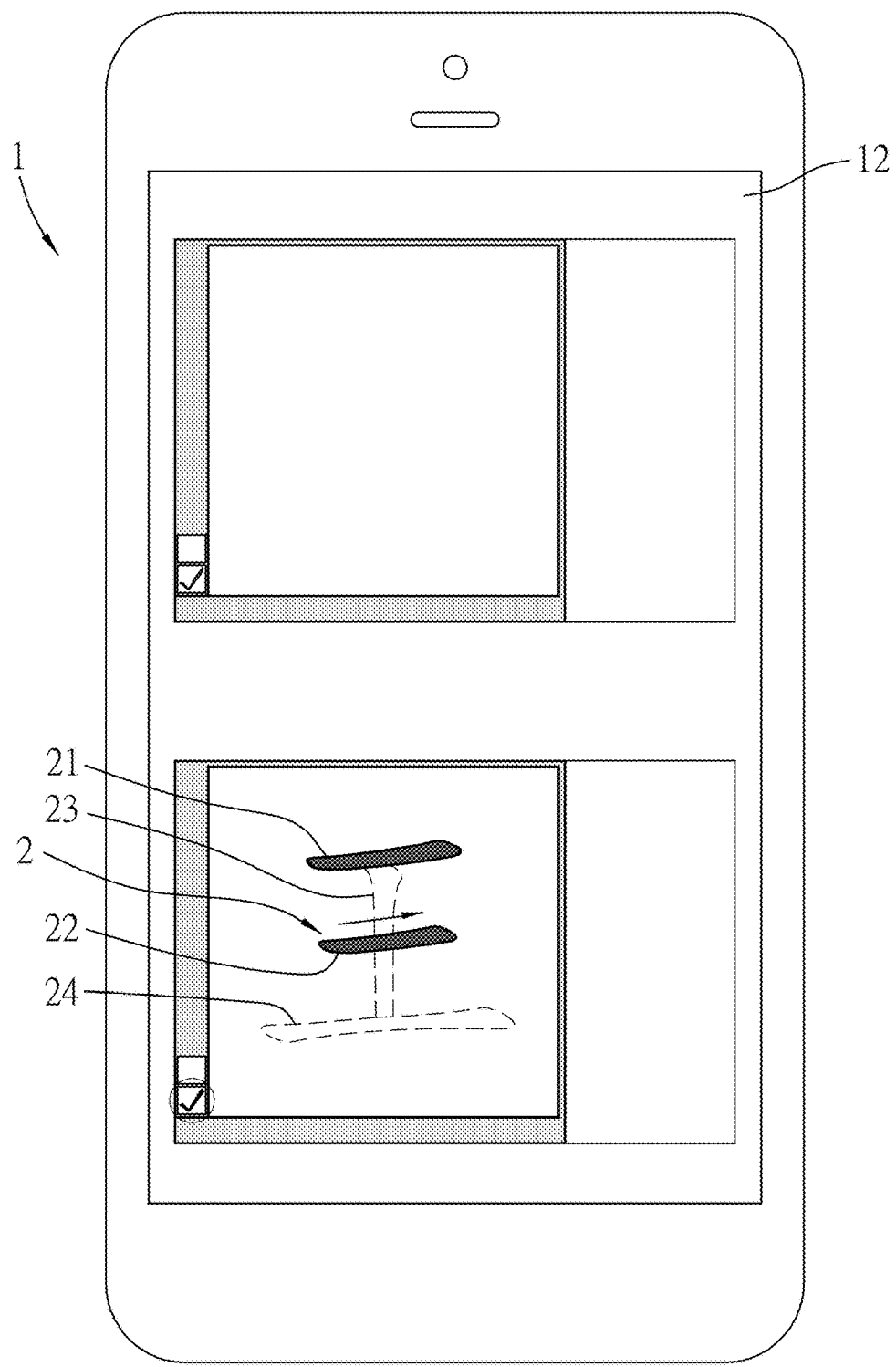
Figure 6:
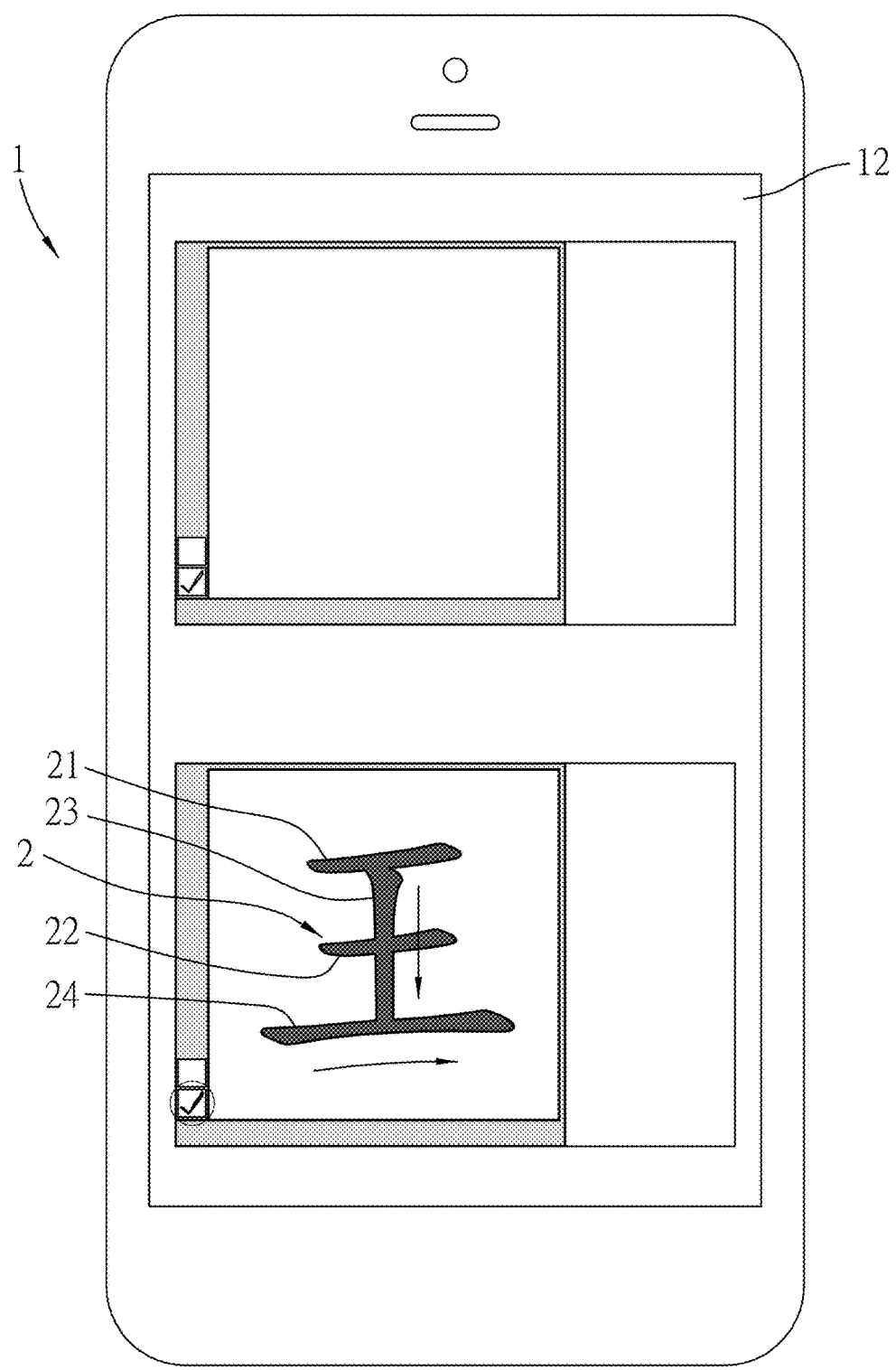

In displaying the standard image, the display unit 12 is controlled to first display a contour of the standard word character 2 (or specifically, contours of the standard strokes 21-24) in broken lines (see FIG. 3). Afterward, the display unit 12 is controlled to present a standard manner in which the standard word character should be written. For example, FIG. 4 illustrates the first standard stroke 21 being "written" along a corresponding standard direction (indicated by the arrow), by filling a space defined by the corresponding contour. FIG. 5 illustrates the second standard stroke 22 being "written" along a corresponding standard direction (indicated by the arrow). FIG. 6 illustrates the third standard stroke 23 and the fourth standard stroke 24 being "written" along respective standard directions (indicated by the arrows).

As a result, the user may be informed of the standard manner to input the strokes, including the standard order and the standard of the writing directions of the standard strokes 21-24, in order to compose the standard word character 2.

Afterward, in step S2, the processor 14 controls the display unit 12 to instruct the user to imitate writing of the standard word character 2. Subsequently, the user may operate the electronic device 1 using a finger 9 (see FIG. 7) or an input device (e.g., a stylus device, a mouse, etc.) to input a plurality of user-imitating strokes over the displayed standard word character 2 in the region 101.

In response, the touch interface 11 generates a plurality of imitating data sets in response to user input of the plurality of user-imitating strokes, respectively.

In step S3, the processor 14 generates a plurality of imitating strokes according to the imitating data sets, respectively.

Specifically, for each of the user-imitating strokes, as soon as the user starts inputting the user-imitating stroke on the touch interface 11, the touch interface 11 may detect a touch event upon contact between the touch interface 11 and the finger 9 or the input device, or upon detection of a click and hold action on a button of the mouse. The touch event is regarded by the processor 14 as a beginning of writing of the user-imitating stroke.

After detection of the touch event, the touch interface 11 may obtain a location (i.e., pixel(s) on the touch interface 11) of the contact. For example, the location of the contact is represented by a set of coordinates with respect to the touch interface 11. The processor 14 then records the set of coordinates according to the pixel(s) on the touch interface 11.

Afterward, as the user moves the finger 9 or the stylus device, more sets of coordinates may be continuously generated and sequentially recorded until a release event is detected. The release event may be a determination that the touch interface 11 is no longer in contact with the finger 9 or the stylus device or a determination that the button of the mouse is released, and is regarded by the processor 14 as an end of writing of the user-imitating stroke.

The sets of coordinates recorded between the touch event and the release event (i.e., the locations on the touch interface 11 where the finger 9 or the input device has touched during the writing of the user-imitating stroke) are then included in one of the imitating data sets.

When a subsequent touch event is detected, the processor 14 may start recording additional sets of coordinates until occurrence of another release event, and include the recorded sets of coordinates in a subsequent one of the imitating data sets. Accordingly, the processor 14 generates each of the imitating strokes to include the sets of coordinates according to a corresponding one of the imitating data sets.

Figure 7:
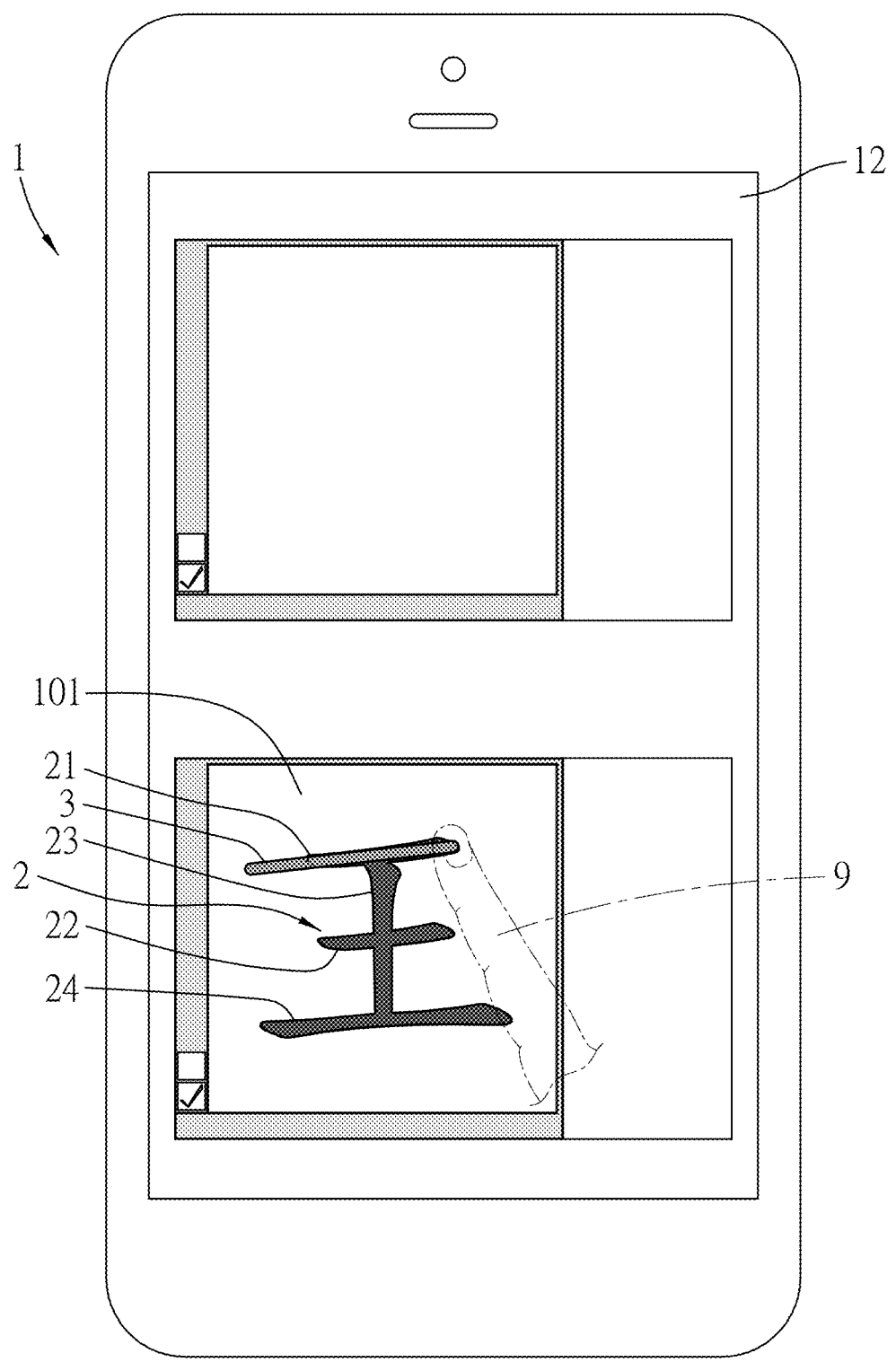
FIG. 7 illustrates an imitating stroke being written.

FIG. 7 illustrates one of the imitating strokes 3. Based on a location in which the user-imitating stroke corresponding with the imitating stroke 3 is received, the processor 14 may determine that the imitating stroke 3 is for imitating the first standard stroke 21.

In step S4, the processor 14 determines whether the imitating stroke 3 conforms with the corresponding first standard stroke 21 to which the imitating data set, based on which the imitating stroke 3 is generated, corresponds. Specifically, the processor 14 compares a direction of the imitating stroke 3 depicted in FIG. 7 and the standard direction corresponding with the first standard stroke 21, and compares a length of the imitating stroke 3 and a length of the first standard stroke 21. It is noted that the determination of the direction and length may be carried out using mechanisms known to those skilled in the art, and details thereof are omitted herein for the sake of brevity.

When it is determined that the imitating stroke 3 is different from the first standard stroke 21 in one of direction and length, the processor 14 controls the display unit 12 to display a notification of an error in the imitating stroke. Otherwise, when it is determined that each of the imitating stroke 3 is not different from a corresponding one of the standard strokes 21 to 24, the processor 14 may control the display unit 12 to display a correct notification.

Figure 8:
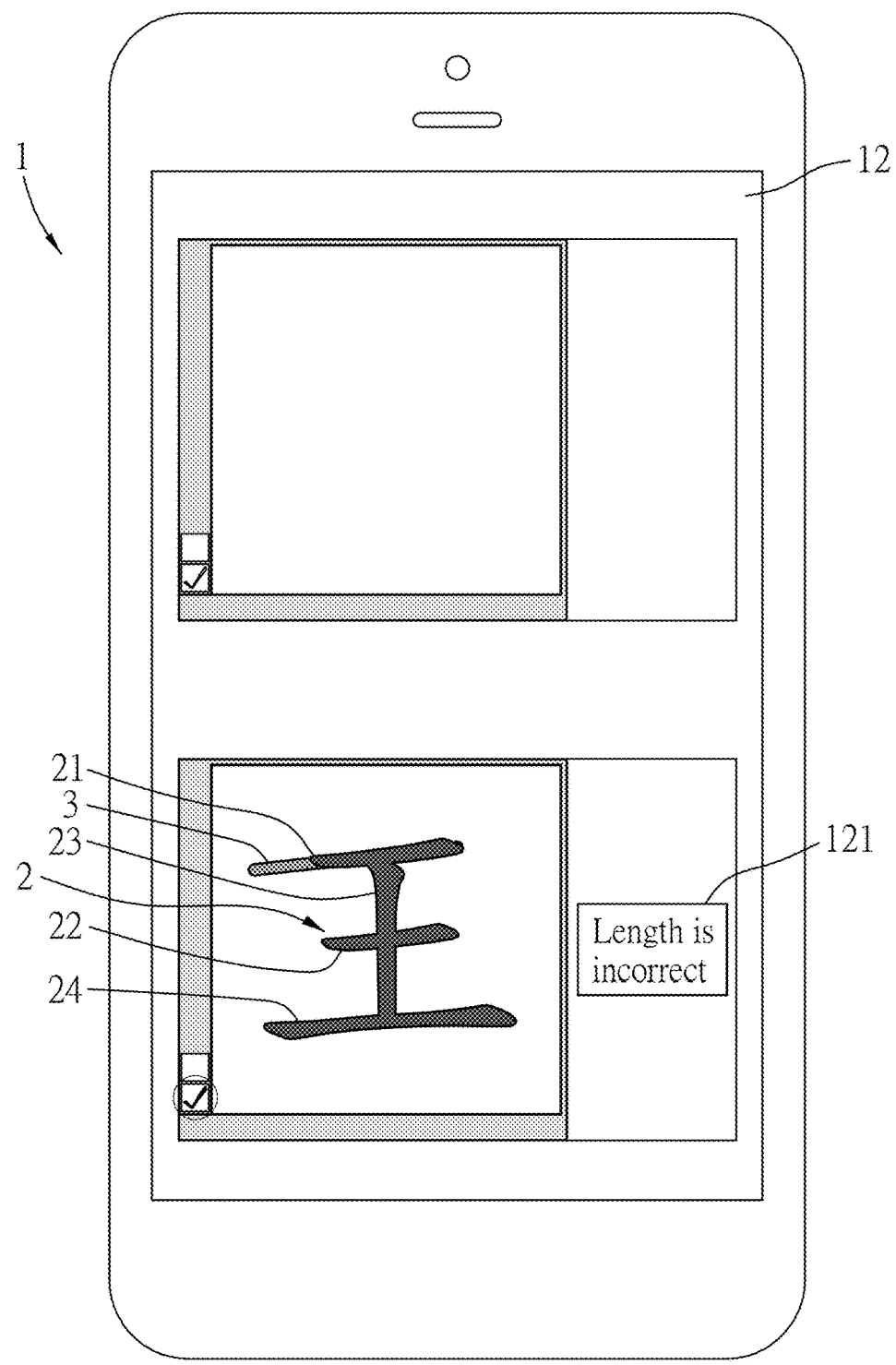
FIG. 8 illustrates one example of a notification being displayed by a display unit.

FIG. 8 illustrates one example of the notification 121 of length error being displayed by the display unit 12. In this example, the processor 14 determines that the length of the imitating stroke 3 is significantly larger than the standard length of the first standard stroke 21, and therefore controls the display unit 12 to display the notification 121 to inform the user of the error.

It is noted that step S4 is performed repeatedly for all of the imitating strokes, and whenever it is determined that any one of the imitating strokes is different from the corresponding one of the standard strokes 21-24 in one of direction and length, the processor 14 is programmed to control the display unit 12 to display the notification of an error for said one of the imitating strokes.

Steps S1 to S4 provide a way for the user to imitate writing of the standard word character 2 that he/she is not familiar with. Therefore, the contour of the standard word character 2 (or the contours of the standard strokes 21-24) and the standard manner are shown.

Figure 9A:
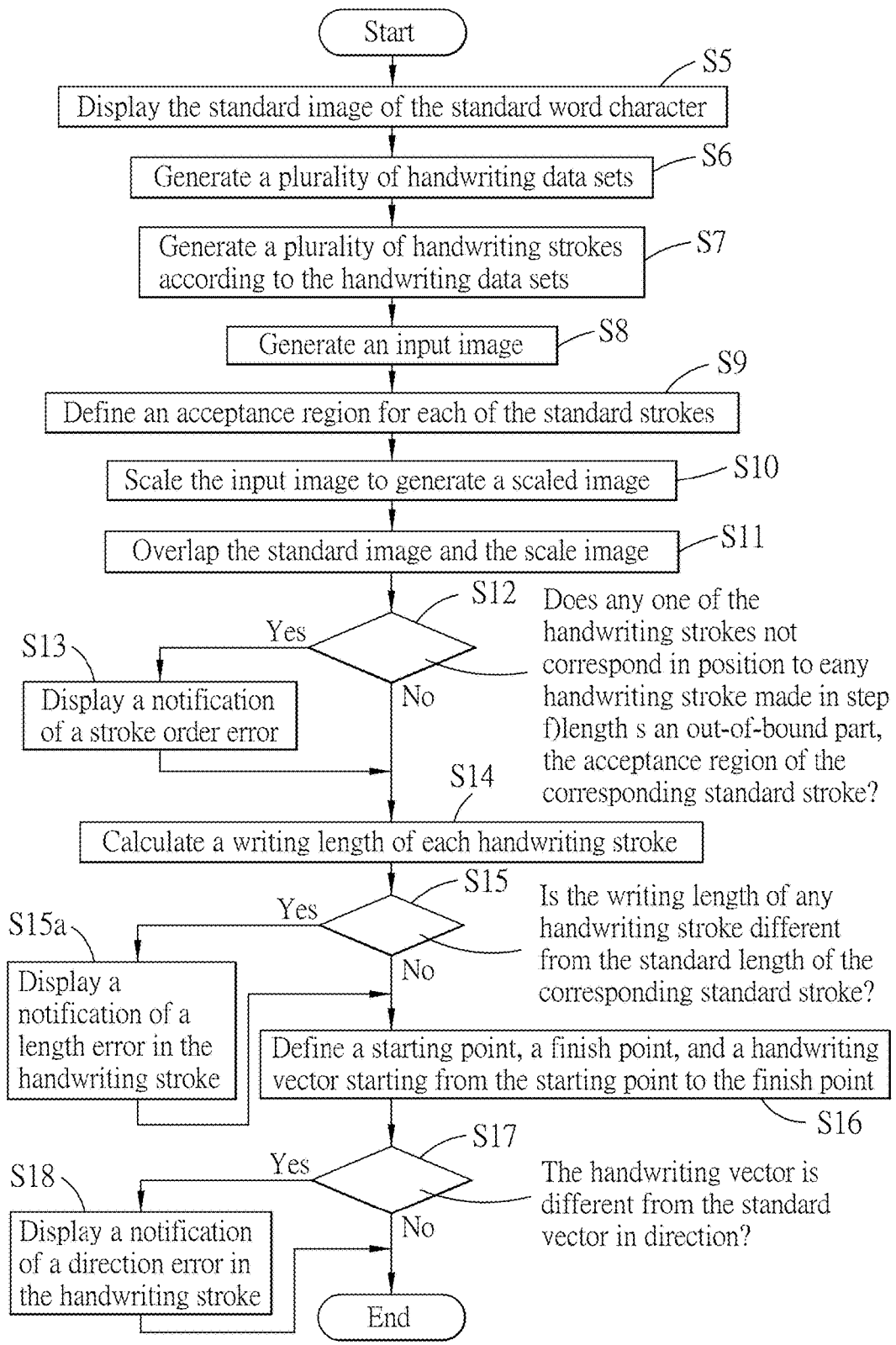
FIGS. 9A to 9C are flow charts illustrating steps of a method for facilitating handwriting practice to be implemented by the electronic device, according to one embodiment of the disclosure.

In a more advanced stage, the user may be somewhat familiar with the standard word character 2, and the processor 14 may initiate a method for advanced practice as shown in FIGS. 9A to 9O.

In step S5, the processor 14 controls the display unit 12 to display the standard image of the standard word character 2 (e.g., the standard character "王") in the region 101. Additionally, the display unit 12 is controlled to instruct the user to attempt to input the standard word character 2 in a separate region 102 (see FIG. 10). In some embodiments, the step of displaying the standard image may be omitted for a more advanced user.

Subsequently, the user may operate the electronic device 1 to input an intended word character with reference to the displayed standard word character 2. The intended word character is composed by a plurality of user-writing strokes.

In step S6, the touch interface 11 generates a plurality of handwriting data sets in response to user input of the plurality of user-writing strokes, respectively.

In step S7, the processor 14 generates a plurality of handwriting strokes according to the handwriting data sets, respectively. The handwriting strokes compose a handwriting word character. It is noted that a manner in which the processor 14 generates the handwriting strokes may be similar to that in which the processor 14 generates the imitating strokes, as previously described. That is to say, for each of the handwriting strokes, a number of sets of coordinates are recorded and included in the respective imitating data set by the processor 14.

Figure 10:
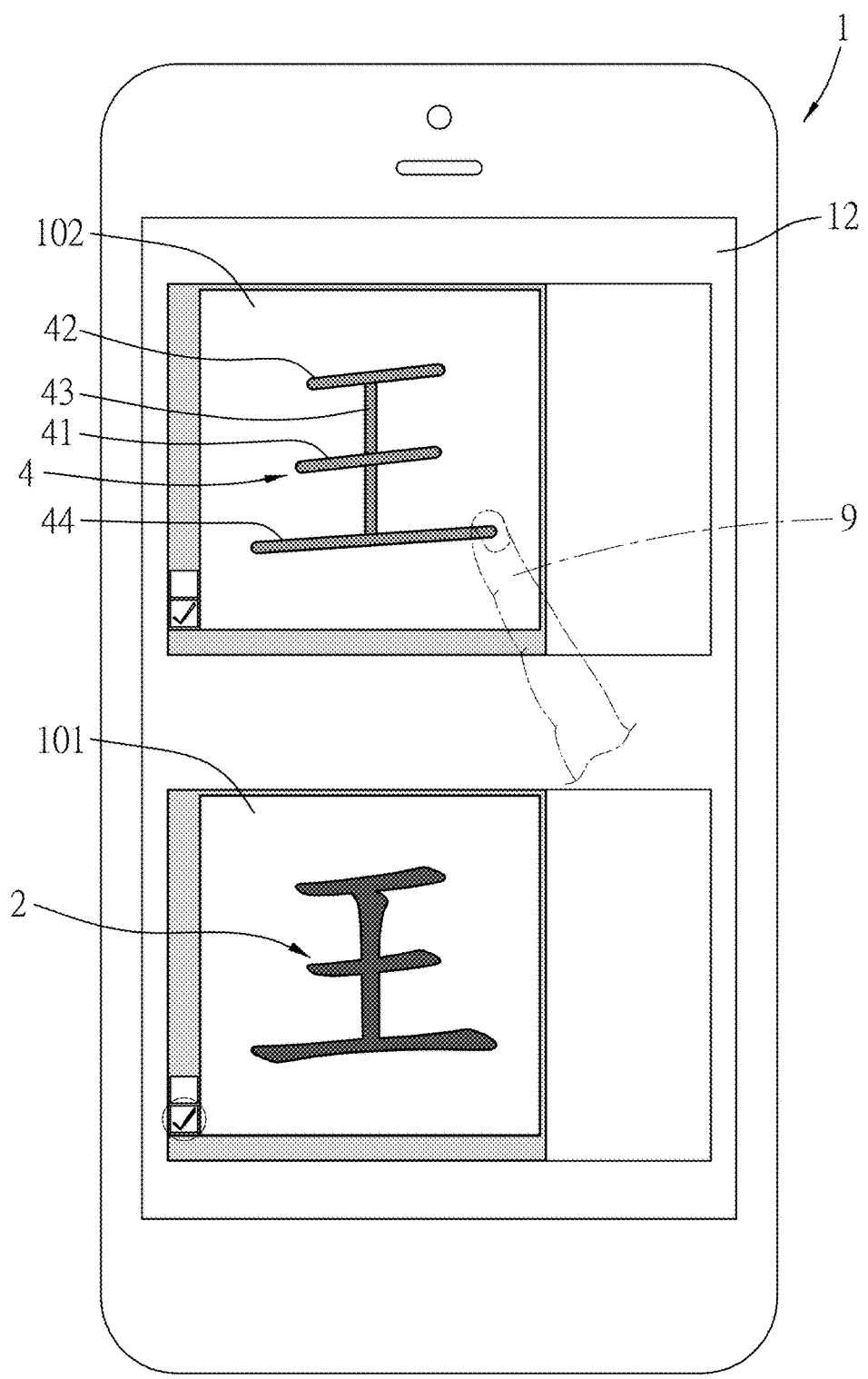
FIG. 10 illustrates the standard word character being displayed, and a handwriting word character inputted by a user being displayed in a separate region of the display unit.

In this embodiment, as shown in FIG. 10, four handwriting strokes 41 to 44 are generated to compose the handwriting word character 4, and are numbered based on time instances at which the user-writing strokes are received. For example, the first one of the handwriting strokes generated is numbered as the first handwriting stroke 41, the second one of the handwriting strokes generated is numbered as the second handwriting stroke 42, and so on.

Figure 11:
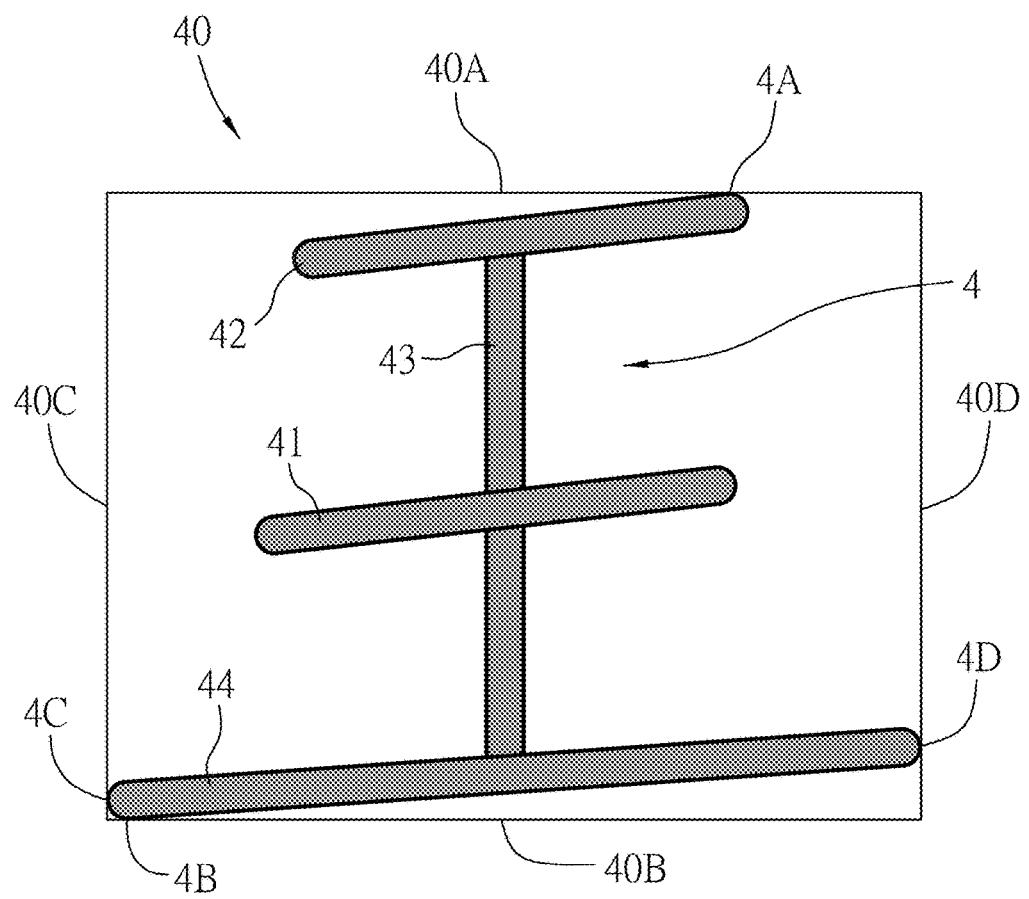
FIG. 11 illustrates an input image that includes the handwriting word character.

In step S8, the processor 14 generates an input image 40 (see FIG. 11). As illustrated in FIG. 11, the input image 40 includes the handwriting word character 4 that includes the handwriting strokes 41 to 44, has a boundary including edges 40A to 40D passing through an upmost point 4A, a lowermost point 4B, a leftmost point 4C and a rightmost point 4D of the handwriting word character 4, respectively, and has a shape (i.e., rectangle) similar to a shape of the standard image 2 stored in the data storage 13.

In step S9, the processor 14 defines an acceptance region for each of the standard strokes 21 to 24. Specifically, as illustrated in FIG. 12, four acceptance regions 211, 221, 231 and 241 are defined for the standard strokes 21 to 24, respectively. In this embodiment, each of the acceptance regions 211 to 241 is in a rectangular shape, and has a boundary including four edges passing through an upmost point, a lowermost point, a leftmost point and a rightmost point of the respective one of the standard strokes 21 to 24. It is noted that the boundary of the standard image 20 also includes four edges 20A to 20D passing through an upmost point 2A, a lowermost point 2B, a leftmost point 2C and a rightmost point 2D of the standard word character 2, respectively.

Figure 13:
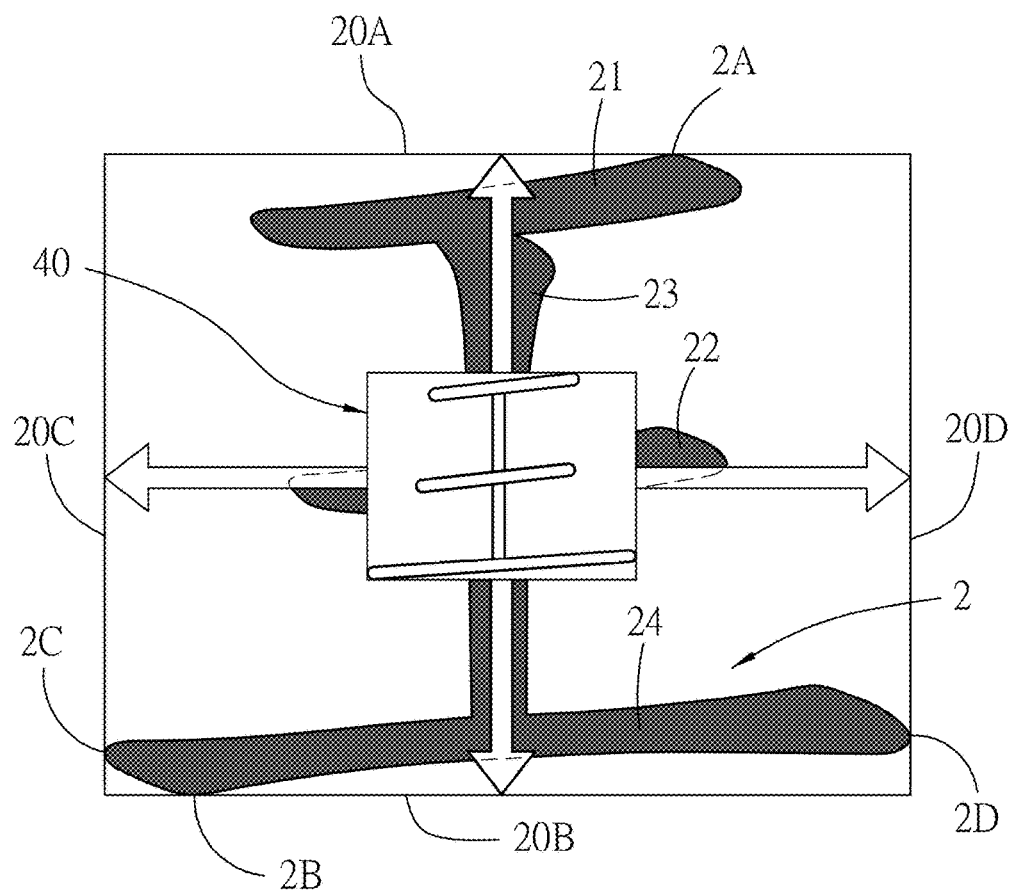
FIG. 13 illustrates scaling of the input image to form a scaled image.

In step S10, the processor 14 scales the input image 40 to form a scaled image 40' (see FIG. 14) that is the same in size as the standard image 20. Specifically, as illustrated in FIG. 13, the input image 40 is enlarged to fit the size of the standard image 20. This step is implemented to accommodate the difference between the size of the standard word character 2 and the size of the handwriting word character 4 since the size of the handwriting word character 4 is usually different from the size of the standard word character 2.

In step S11, the processor 14 overlaps the standard image 20 and the scale image 40'.

In step S12, the processor 14 compares an $n^{th}$ one of the handwriting strokes 41-44 in the scaled image 40' with a corresponding one of the standard strokes 21-24 that has an $n^{th}$ position in the standard order of the standard word character 2, where n is an integral variable ranging from 1 to the number of the handwriting strokes 41-44 (i.e., 4).

Figure 14:
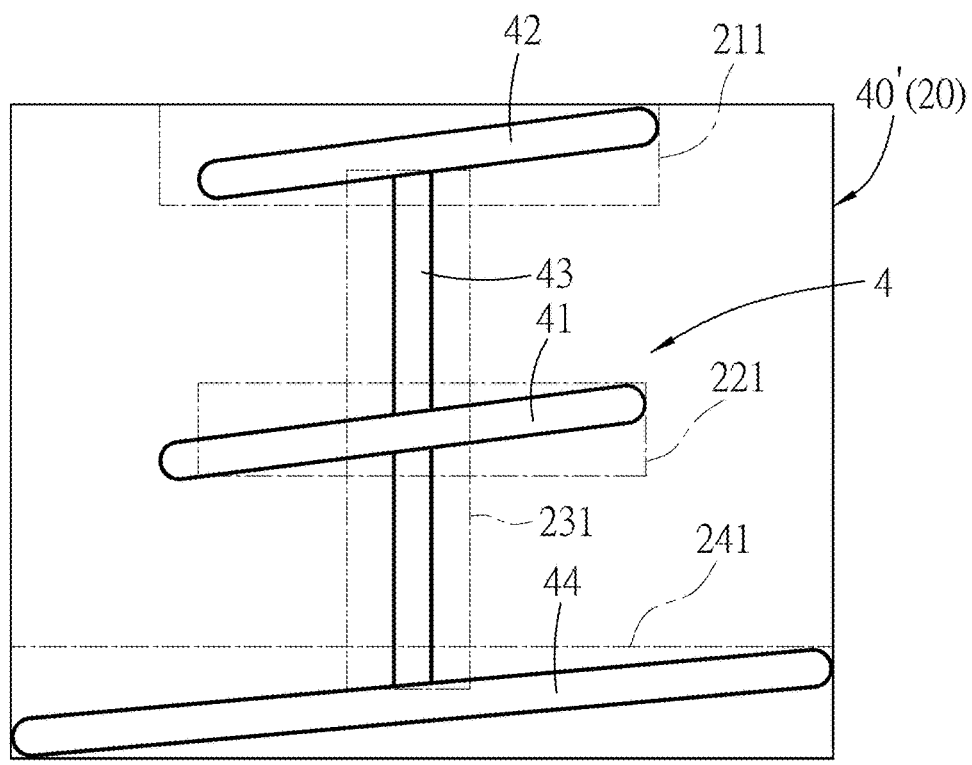
FIG. 14 illustrates determining whether the handwriting strokes in the scaled image correspond in position to respective acceptance regions.

In one example with reference to FIG. 14, the processor 14 determines whether each of the handwriting strokes 41 to 44 in the scaled image 40' corresponds in position with the acceptance region 211, 221, 231 or 241 that covers the corresponding one of the standard strokes 21 to 24 in the standard image 20.

Specifically, the processor 14 first determines whether the first handwriting stroke 41 corresponds in position with the acceptance region 211. Afterward, the processor 14 determines whether the second handwriting stroke 42 corresponds in position with the acceptance region 221, and so on.

When it is determined that any one of the handwriting strokes 41 to 44 does not correspond in position with the corresponding one of the acceptance regions 211, 221, 231, 241, the processor 14 controls the display unit 12 to display a notification of a stroke order error in the handwriting word character in step S13 to notify that the user-writing strokes are not written in the standard order.

Figure 9B:
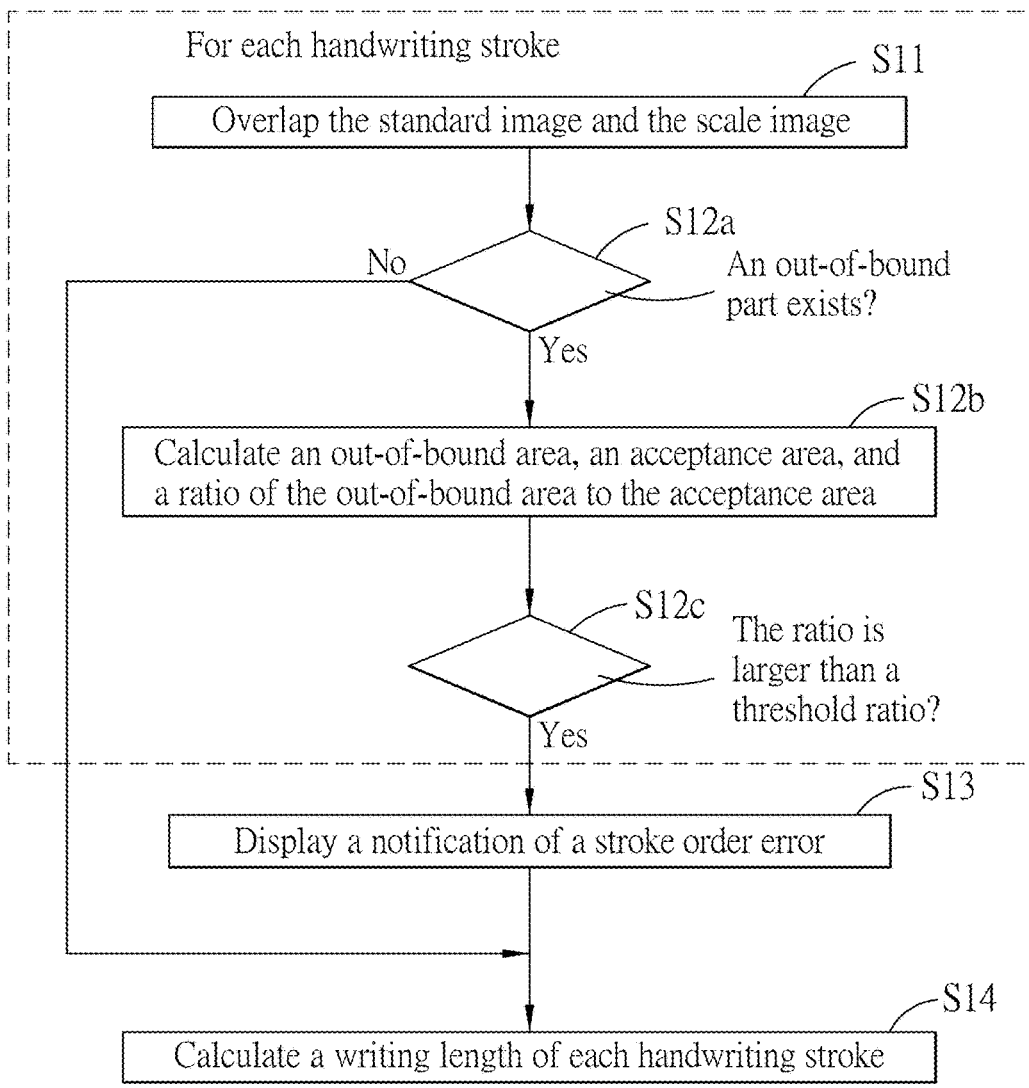

Referring to FIG. 9B, in one example, step S12 includes the following sub-steps.

In sub-step S12a, for each of the handwriting strokes 41 to 44, the processor 14 compares the handwriting stroke 41, 42, 43 or 44 with the corresponding one of the acceptance regions 211, 221, 231 and 241 to determine whether the handwriting stroke 41, 42, 43 or 44 has an out-of-bound part that is outside of the corresponding one of the acceptance regions 211, 221, 231 and 241.

In implementing such a determination, the processor 14 may first determine a range of location of the first acceptance region 211, based on a contour of the first acceptance region 211. Afterward, the processor 14 determines whether the location of the first handwriting stroke 41 is within the range of location of the first acceptance region 211 according to the sets of coordinates included in the handwriting data set corresponding to the first handwriting stroke 41.

Taking the scaled image 40' as illustrated in FIG. 14 as an example, the first handwriting stroke 41 is completely out of the corresponding acceptance region 211, and the second handwriting stroke 42 is completely out of the corresponding acceptance region 221. As a result, it is determined that each of the handwriting strokes 41 and 42 has an out-of-bound part.

When it is determined that at least one of the handwriting strokes 41 to 44 has an out-of-bound part, the flow proceeds to sub-step S12b. Otherwise, the processor 14 may determine that all user-writing strokes were inputted in the standard order.

In sub-step S12b, for any of the handwriting strokes 41 to 44 that has an out-of-bound part, the processor 14 calculates an out-of-bound area indicating an area of the out-of-bound part, an acceptance area of the corresponding one of the acceptance regions 211, 221, 231, 241, and a ratio of the out-of-bound area to the acceptance area. In the example of FIG. 14, the ratio for each of the handwriting strokes 41 and 42 is 100%.

In sub-step S12c, the processor 14 determines that one of the handwriting strokes 41 to 44 does not correspond in position to the corresponding one of the acceptance regions 211, 221, 231, 241 when the corresponding ratio is larger than a threshold ratio (e.g., 80 percent). In the example of FIG. 14, the processor 14 determines that both the handwriting strokes 41 and 42 do not correspond in position to the respective acceptance regions 211 and 221. As a result, the notification of a stroke order error is displayed (step S13).

Figure 15:
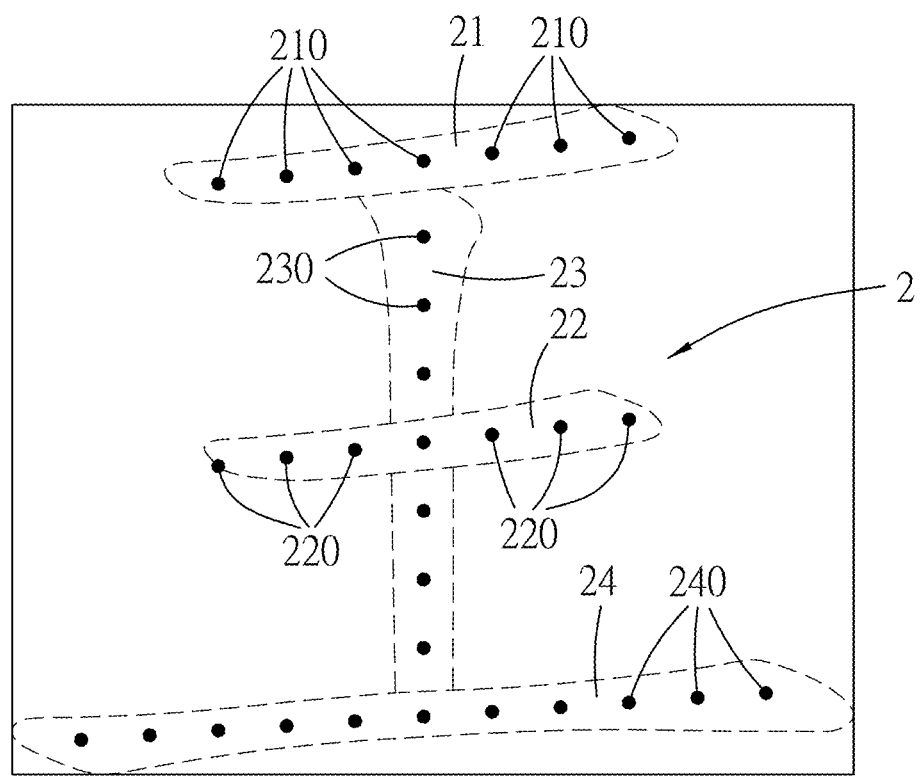
FIG. 15 illustrates a standard image, with each of the standard strokes having trace points therein.

Other than using the acceptance regions to perform step S12, a number of ways may be employed. In another example, the standard image 20 includes a plurality of trace points on each of the standard strokes 21 to 24. FIG. 15 illustrates one such standard image 20, with each of the standard strokes 21 to 24 having trace points therein. Specifically, the first standard stroke 21 includes seven trace points 210, the second standard stroke 22 includes seven trace points 220, the third standard stroke 23 includes seven trace points 230, and the fourth standard stroke 24 includes eleven trace points 240.

Figure 9C:
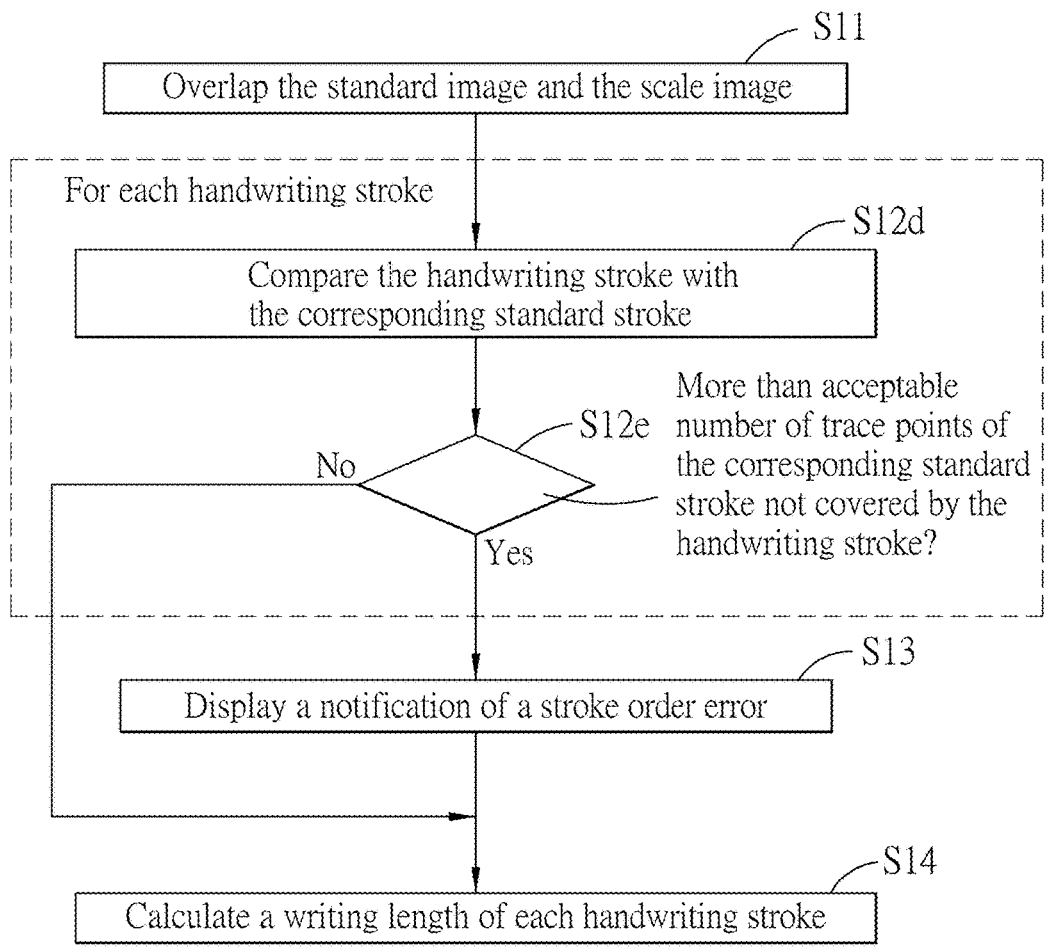
Figure 16:
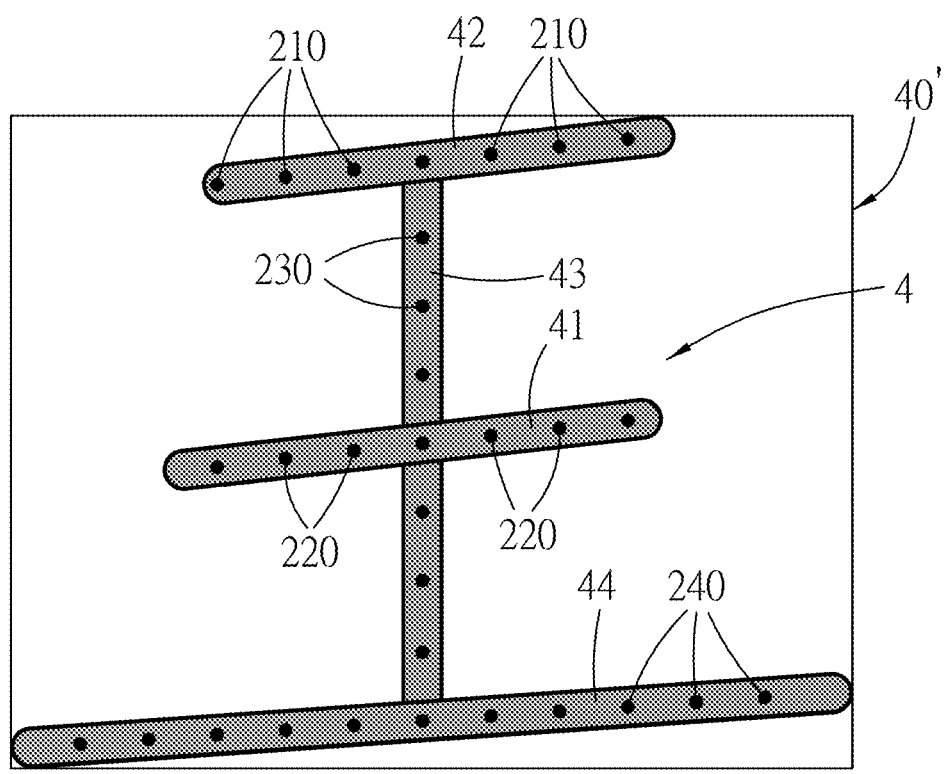
FIG. 16 illustrates determining whether each handwriting stroke covers all of the trace points of a corresponding standard stroke.

Referring to FIG. 9C, in this example, step S12 includes the following sub-steps. FIG. 16 illustrates the scaled image 40' and the standard image 2 as illustrated in FIG. 15 being overlapped thereon where only the trace points 210, 220, 230 and 240 in the standard image 20 are shown.

In step S12d, the processor 14 is programmed to, for each of the handwriting strokes 41 to 44, compare the handwriting stroke 41, 42, 43 or 44 with the corresponding one of the standard strokes 21 to 24 to determine whether the handwriting stroke 41, 42, 43 or 44 covers all of the trace points 210, 220, 230 or 240 of the corresponding one of the standard strokes 21, 22, 23 or 24.

Afterward, in sub-step S12e, when at least one of the trace points 210, 220, 230, 240 of one of the standard strokes 21 to 24 is not covered by the corresponding handwriting stroke 41 to 44, the processor 14 determines that the stroke order does not conform with the standard order. In some embodiments, the above determination is made when less than 80% of the trace points 210, 220, 230, 240 in one of the standard strokes 21 to 24 is not covered by the corresponding handwriting stroke 41, 42, 43 or 44.

In the example of FIG. 16, the first handwriting stroke 41 does not cover any of the trace points 210 in the corresponding standard stroke 21. Moreover, the second handwriting stroke 42 does not cover any of the trace points 220 in the corresponding standard stroke 22. As a result, the processor 14 determines that both the first and second handwriting strokes 41 and 42 were not inputted in the standard order.

It is noted that using the trace points 210, 220, 230 and 240 for determining whether the handwriting strokes 41 to 44 were inputted in the standard order may be more accurate than using acceptance regions 211 to 241 in certain cases.

For example, some particular word character may include a stroke that reaches across the entire word character (e.g., the first standard stroke "く" of the Chinese character "女"). For such a word character, the first acceptance region may be defined to have a size approximately the same as the size of the corresponding standard image. As a result, the processor 14 may not be able to accurately determine whether a first handwriting stroke correctly corresponds in position to the first standard stroke "く" of the Chinese character "女" since the first handwriting stroke, regardless of which of the standard strokes the first handwriting stroke corresponds to, would likely end up located within the first acceptance region, which is approximately as large as the standard image itself. In such cases, the trace points may then be employed for performing the determination. In this embodiment, both the acceptance regions and the trace points are employed, but in other embodiments, the acceptance regions and the trace points may be employed separately.

Figure 17:
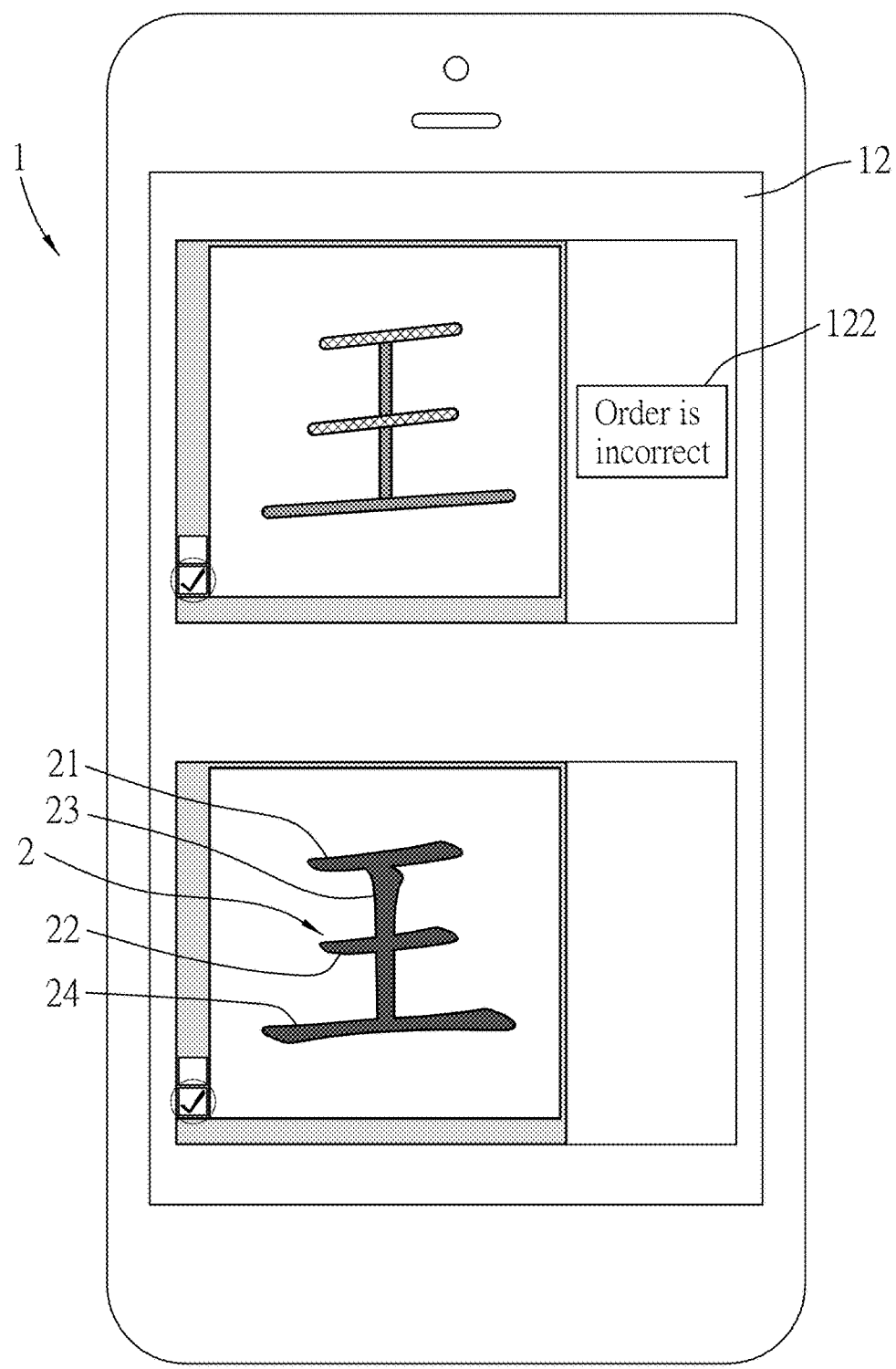
FIG. 17 illustrates a notification of a stroke order error in the handwriting word character being displayed.

Referring to FIG. 9B again, when any one of the handwriting strokes 41 to 44 does not correspond in position to the corresponding one of the standard strokes 21 to 24, the notification of a stroke order error in the handwriting word character is displayed in step S13. Specifically, referring to FIG. 17, the notification may be displayed in a message box 122, and include a text message indicating that the handwriting word character 4 was inputted in an incorrect order. Alternatively, the first and second handwriting strokes 41 and 42 that were inputted in the incorrect order may be highlighted using a specific color and/or a pattern different from that of other handwriting strokes 43 and 44 that were inputted in a correct order.

It is noted that in addition to determining whether the stroke order is correct, the processor 14 may be further programmed to perform other determinations regarding the handwriting word character 4.

For example, the processor 14 may be performed to determine whether a length for each handwriting stroke 41, 42, 43 or 44 is adequate.

In this embodiment, the processor 14 is programmed to calculate a standard length for each of the standard strokes 21 to 24.

Then, in step S14, the processor 14 calculates, for each of the handwriting strokes, calculate a writing length of the handwriting stroke according to a corresponding one of the handwriting data sets.

In step S15, for each of the handwriting strokes, the processor compares the writing length of the handwriting stroke with the standard length of the corresponding one of the standard strokes to determine whether the writing length differs from the corresponding standard length.

In step S16, when it is determined that the writing length of at least one of the handwriting strokes is different from the corresponding standard length, the processor 14 controls the display unit 12 to display a notification of a length error in the handwriting stroke. In this embodiment, the determination is made by the processor 14 calculating a difference between the writing length and the standard length, calculating a ratio of the difference to the standard length, and determining that the writing length of one of the handwriting strokes is different from the corresponding standard length when the ratio is larger than a threshold ratio (e.g., 20%).

Figure 18:
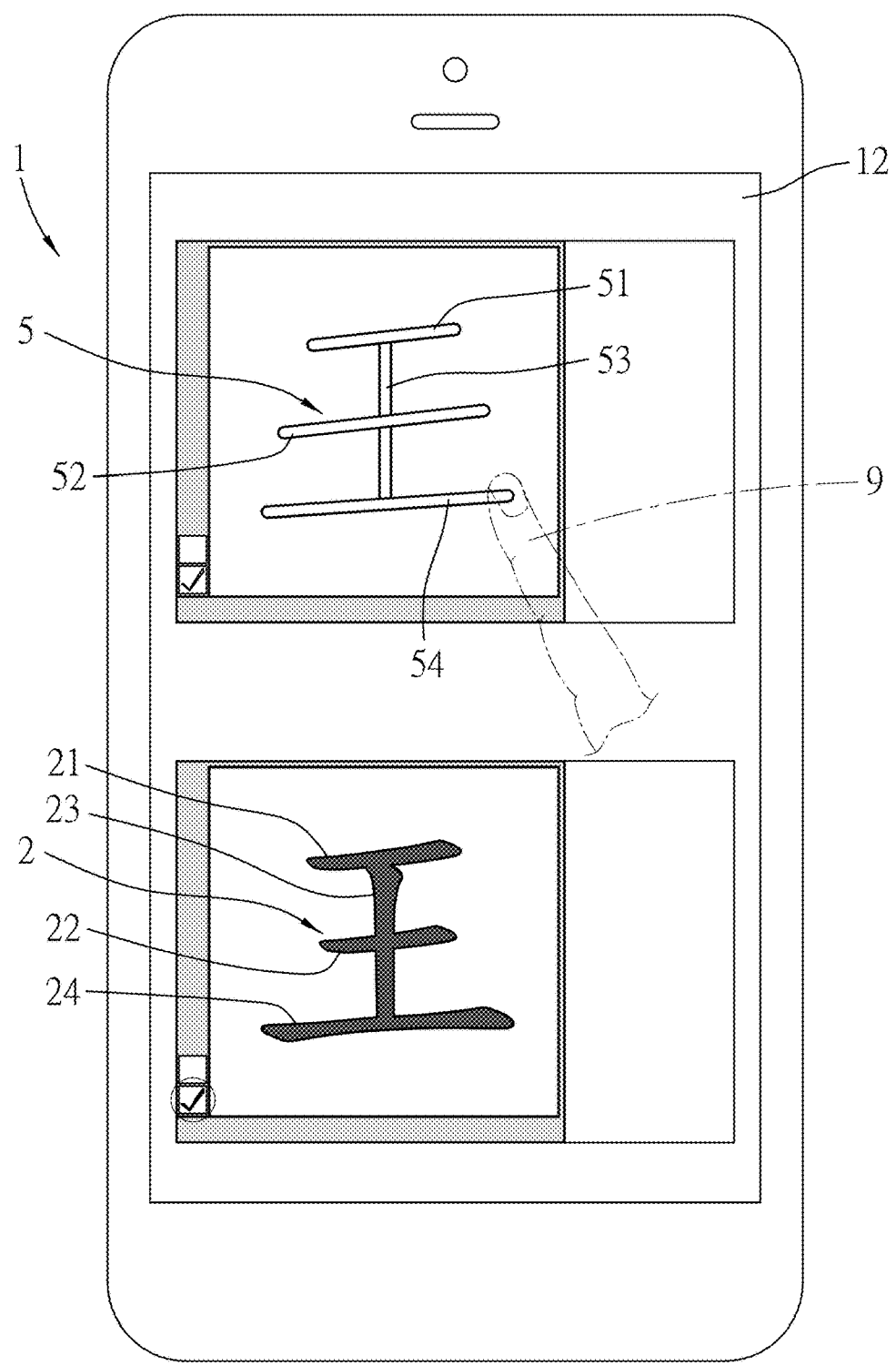
FIG. 18 illustrates a handwriting word character and the corresponding standard word character.

FIG. 18 illustrates another handwriting word character 5 and the corresponding standard word character 2. Each of the standard strokes 21 to 24 has a standard length, and each of the handwriting strokes 51 to 54 has a writing length.

Figure 19:
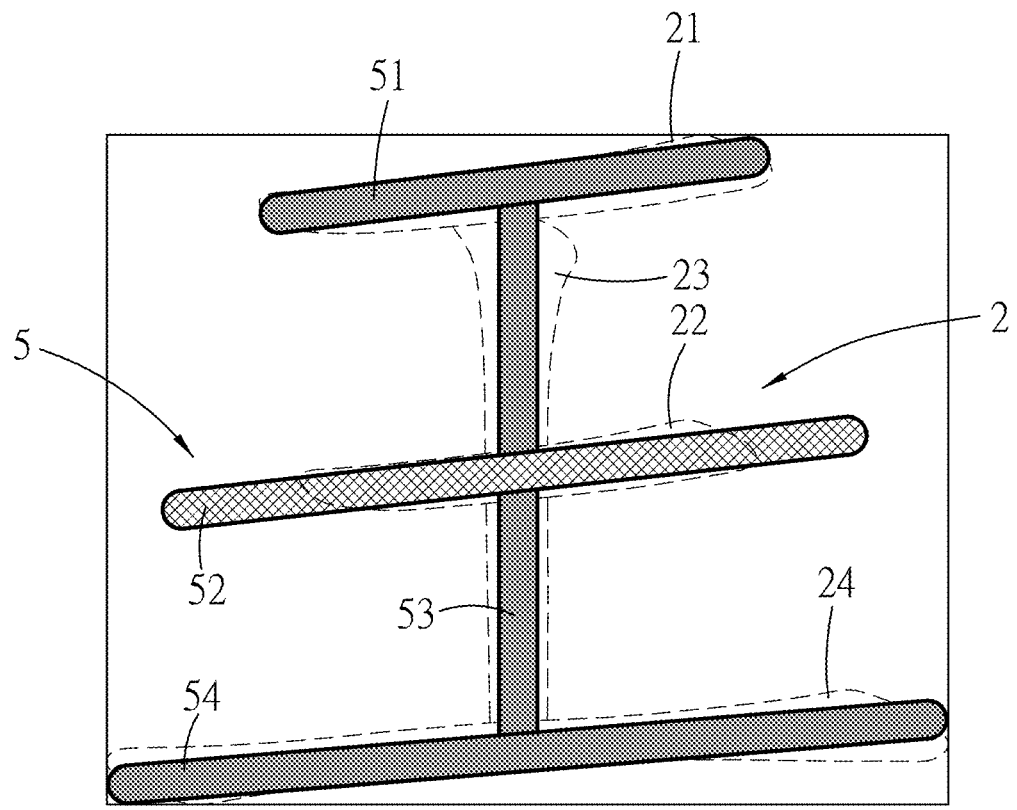
FIG. 19 illustrates comparison of writing lengths respectively with standard lengths.
Figure 20:
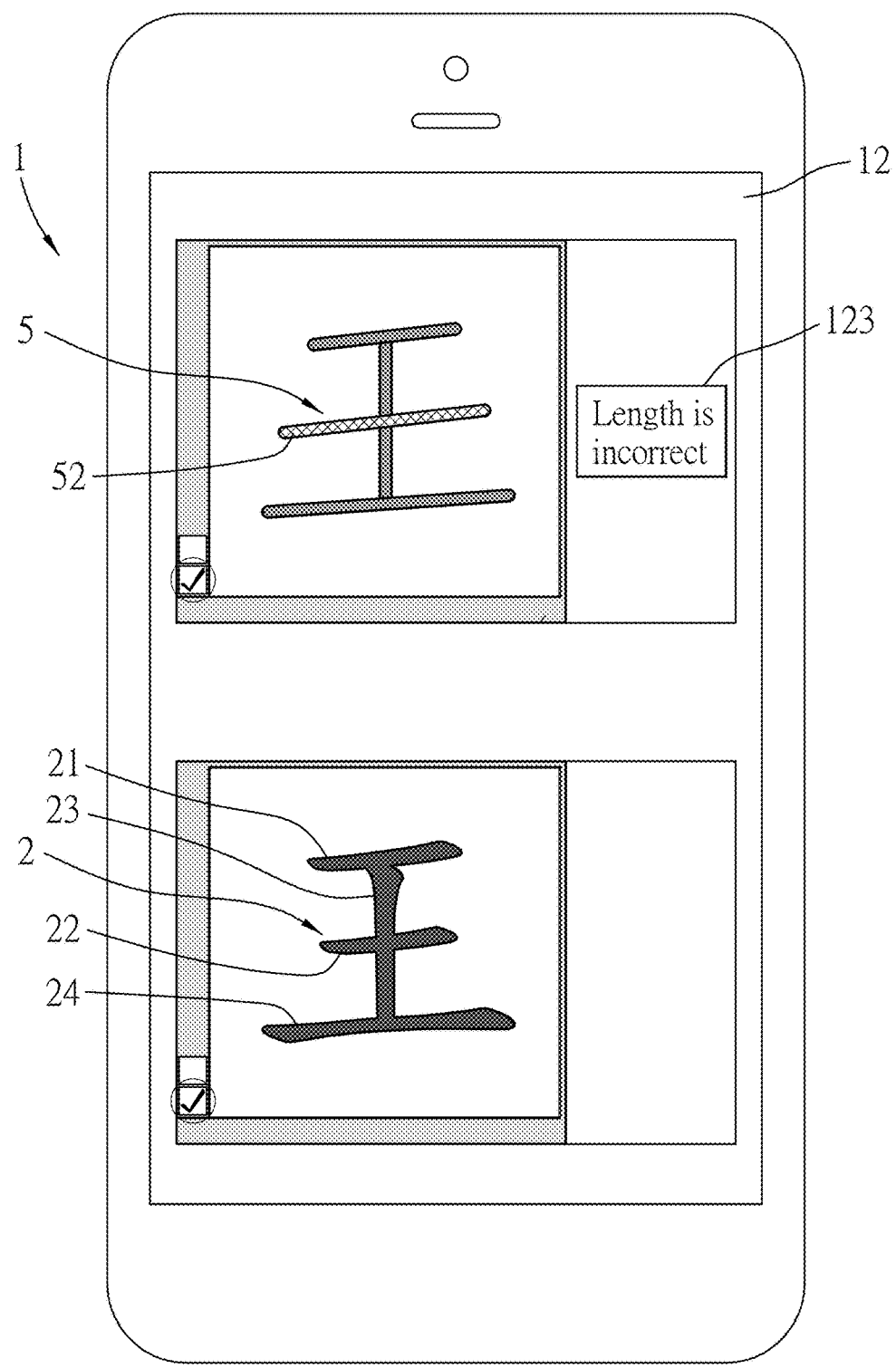
FIG. 20 illustrates a notification of a length error in the handwriting stroke being displayed.

As such, in step S15, the processor 14 compares the writing lengths respectively with the standard lengths. FIG. 19 illustrates such a comparison. It may be determined that the second handwriting stroke 52 is significantly longer than the corresponding second standard stroke 22 (the difference being more than 20% of the standard length of the second standard stroke 22). Therefore, the display unit 12 is controlled to display a notification of a length error in the handwriting stroke in step S15a. This may be implemented by highlighting the second handwriting stroke 52, as shown in FIG. 19, which may optionally be accompanied by a text message in a message box 123 as shown in FIG. 20.

In some embodiments, the processor 14 is further programmed to check whether each handwriting stroke was inputted along a correct direction.

Specifically, for each of the standard strokes 21 to 24 of the standard word character 2, the processor 14 pre-calculates a starting point, a finish point, and a standard vector starting from the starting point to the finish point. The above information may be stored with the standard image 20 in the data storage 13.

In use, in step S16, the processor 14 defines, for each of the handwriting strokes, a starting point, a finish point, and a handwriting vector starting from the starting point to the finish point, according to the corresponding one of the handwriting data sets.

In step S17, the processor 14 compares the handwriting vector to the standard vector to determine whether the handwriting vector is different from the standard vector in direction. Specifically, the determination may be made by the processor 14 calculating an included angle between the handwriting vector and the standard vector, and determining that the handwriting vector is different from the standard vector in direction when the included angle is larger than a threshold angle (e.g., 10 degrees).

In step S18, when it is determined in step S17 that the handwriting vector is different from the standard vector in direction, the processor 14 controls the display unit 12 to display a notification of a direction error in the handwriting stroke.

Figure 21:
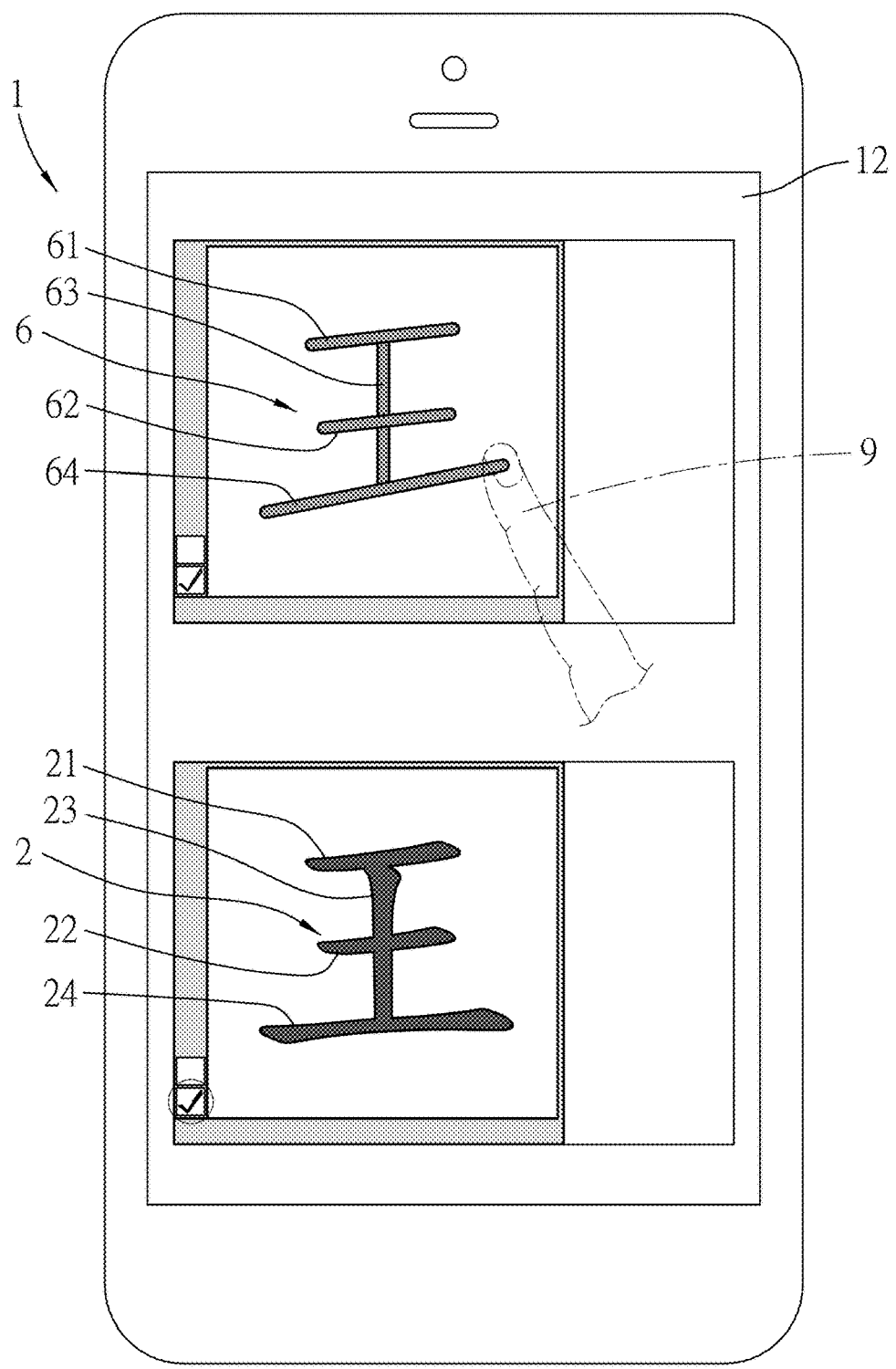
FIG. 21 illustrates a handwriting word character and the corresponding standard word character.
Figure 22:
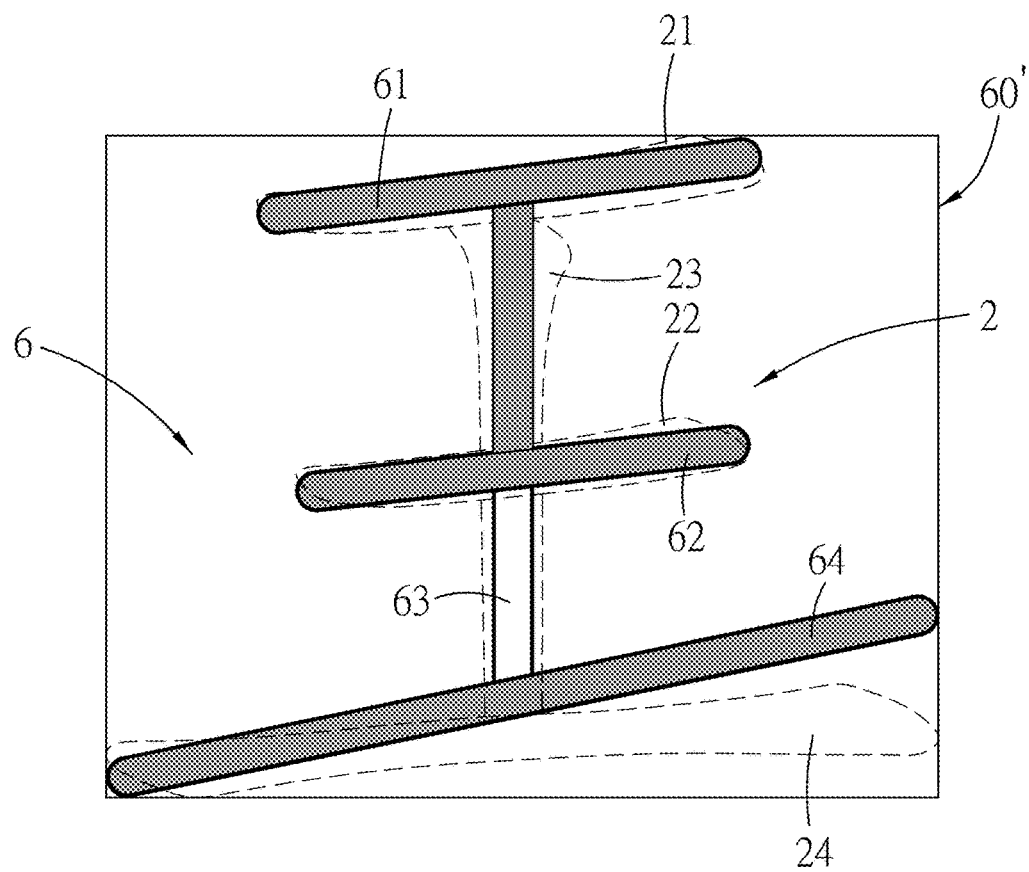
FIGS. 22 to 24 illustrate comparison between a direction of a handwriting stroke of the handwriting word character and a direction of a standard stroke of the standard word character.

FIG. 21 illustrates yet another handwriting word character 6 and the corresponding standard word character 2. FIG. 22 illustrates the resulting scaled image 60' and the standard image 20 being overlapped therewith.

Figure 23:
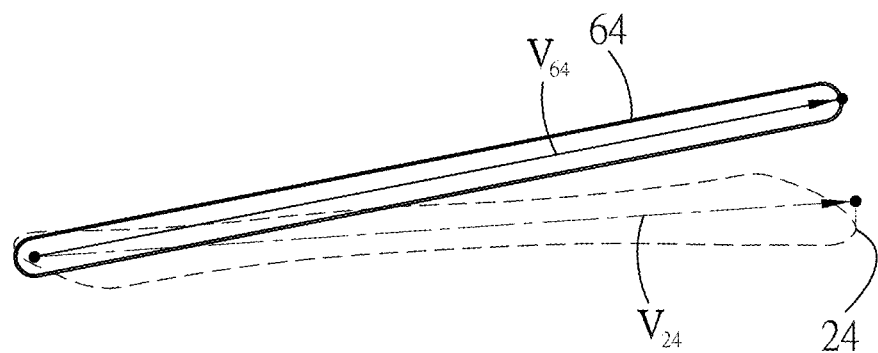
Figure 24:
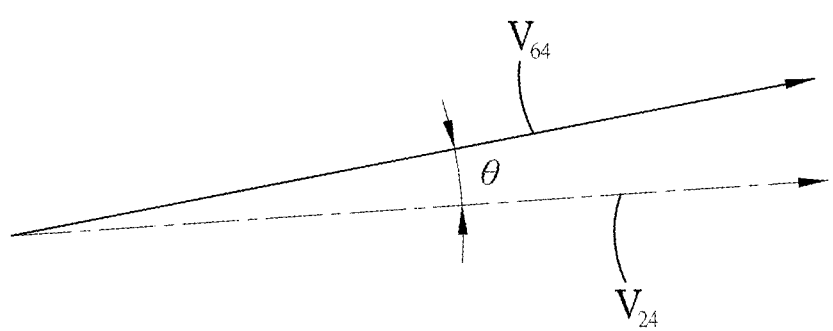

It may be seen in FIG. 22 that the fourth handwriting stroke 64 and the corresponding fourth standard stroke 24 are not parallel to each other. FIG. 23 illustrates the standard vector $V_{24}$ derived from the fourth standard stroke 24 and the handwriting vector $V_{64}$ derived from the fourth handwriting stroke 64, and FIG. 24 illustrates the included angle θ between the standard vector $V_{24}$ and the handwriting vector $V_{64}$.

Figure 25:
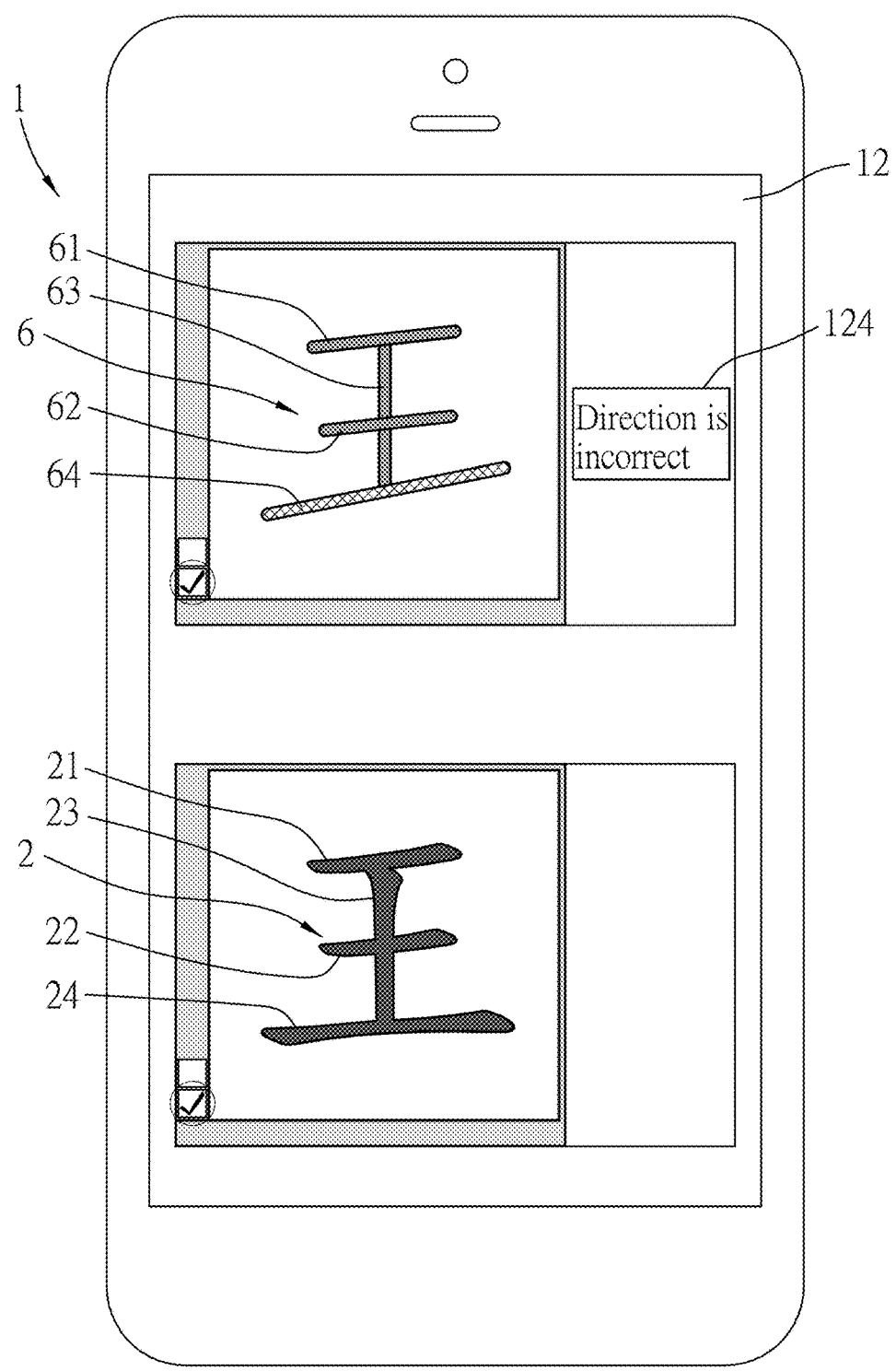
FIG. 25 illustrates a notification of a direction error in the handwriting stroke being displayed.

In this embodiment, the included angle θ is 15 degrees, which is larger than the threshold angle (10 degrees). As a result, the processor 14 determines that the handwriting vector $V_{64}$ is different from the standard vector $V_{24}$ in direction, and then in step S18, the display unit 12 is controlled to display a notification of a direction error in the handwriting stroke. This may be implemented by highlighting the fourth handwriting stroke 64 as shown in FIG. 25, which may optionally be accompanied by a text message in a message box 124 as shown in FIG. 25.

It is noted that, using the mechanism in step S17, the processor 14 is capable of detecting any handwriting stroke being inputted along a direction opposite to the corresponding standard direction, since the resulting included angle will be approximately 180 degrees.

It is noted that, in some embodiments, the determination mechanisms regarding correctness of input of the handwriting word character are implemented sequentially. That is, the processor 14 first determines whether the stroke order conforms with the standard order. When it is determined that the stroke order conforms with the standard order, the flow proceeds to determine whether the writing lengths of the handwriting strokes are adequate. When it is determined that all the writing lengths are adequate, the flow proceeds to determine whether the handwriting strokes are inputted in the corresponding standard directions.

In this embodiment, the flow may be interrupted whenever a "mistake" is found. For example, when it is determined that the stroke order does not conform with the standard order, the processor 14 controls the display unit 12 to display the notification of a stroke order error before continuing to determine correctness of the writing lengths. It is noted that in other embodiments, the processor 14 may be programmed to perform all determination mechanisms before controlling the display unit 12 to display one or more notifications informing the "mistakes" that are found.

To sum up, the method and electronic device 1 as described in the disclosure and the drawings provide a way for a user to practice handwriting of a standard word character. Specifically, the method enables the user to input user-writing strokes on the region 102 on which the contour of the standard word character is not displayed, and is capable of detecting correctness of the handwriting word character including the stroke order, the writing lengths of the handwriting strokes, and the directions of the handwriting strokes.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for facilitating handwriting practice, the method to be implemented using an electronic device that includes a processor, a data storage, a touch interface and a display unit, the data storage storing at least one standard image that is associated with a standard word character composed by a number of standard strokes and that has a boundary passing through an upmost point, a lowermost point, a leftmost point and a rightmost point of the standard word character, the method comprising the steps of:
   a) generating, by the touch interface, a plurality of handwriting data sets in response to user input of a number N of user-writing strokes of an intended word character, respectively;
   b) generating, by the processor, a number N of handwriting strokes according to the handwriting data sets, respectively, the handwriting strokes composing a handwriting word character;
   c) generating, by the processor, an input image that includes the handwriting word character, that has a boundary passing through an upmost point, a lowermost point, a leftmost point and a rightmost point of the handwriting word character, and that has a shape similar to a shape of the standard image stored in the data storage;
   d) scaling, by the processor, the input image to generate a scaled image with a size that is the same as a size of the standard image;
   e) overlapping, by the processor, the standard image and the scaled image;
   f-1) defining, by the processor, an acceptance region for each of the standard strokes;
   f-2) determining, by the processor, whether an $n^{th}$ one of the handwriting strokes in the scaled image corresponds in position to the acceptance region that covers a corresponding one of the standard strokes in the standard image that has an $n^{th}$ position in a standard order of the standard word character, where n is an integral variable ranging from 1 to N; and
   g) when it is determined in step f-2) that any one of the handwriting strokes does not correspond in position to the acceptance region of the corresponding one of the standard strokes, controlling, by the processor, the display unit to display a notification of a stroke order error in the handwriting word character to notify that the user-writing strokes were not inputted in the standard order,
   wherein step f-2) includes sub-steps, for each of the handwriting strokes and the acceptance region of the corresponding one of the standard strokes, of:
      comparing the handwriting stroke with the acceptance region to determine whether the handwriting stroke has an out-of-bound part that is out of the acceptance region;
      when it is determined that the handwriting stroke has an out-of-bound part, calculating an out-of-bound area indicating an area of the out-of-bound part, and a ratio of the out-of-bound area to an acceptance area of the acceptance region; and
      determining that the handwriting stroke does not correspond in position to the acceptance region when the ratio is larger than a threshold ratio.

2. The method of claim 1, wherein, for each of the standard strokes, the acceptance region has a boundary passing through an upmost point, a lowermost point, a leftmost point and a rightmost point of the standard stroke.

3. The method of claim 1, each of the standard strokes having a standard length, wherein the method further comprises, for each of the handwriting strokes, steps of:
   i) calculating, by the processor, a writing length of the handwriting stroke according to the respective one of the handwriting data sets;
   ii) comparing, by the processor, the writing length of the handwriting stroke with the standard length of the corresponding one of the standard strokes; and
   iii) when the writing length of the handwriting stroke is different from the standard length, controlling, by the processor, the display unit to display a notification of a length error in the handwriting stroke.

4. The method of claim 3, wherein step ii) includes sub-steps of:
   calculating a difference between the writing length and the standard length;
   calculating a ratio of the difference to the standard length; and
   determining that the writing length of the handwriting stroke is different from the standard length when the ratio is larger than a threshold ratio.

5. The method of claim 1, each of the standard strokes having a starting point, a finish point, and a standard vector starting from the starting point to the finish point, wherein the method further comprises, for each of the handwriting strokes, the steps of:
   I) defining, by the processor, a starting point and a finish point of the handwriting stroke, and a handwriting vector starting from the starting point to the finish point according to the respective one of the handwriting data sets;
   II) comparing, by the processor, the handwriting vector to the standard vector; and
   III) when the handwriting vector is different from the standard vector in direction, controlling, by the processor, the display unit of display a notification of a direction error in the handwriting stroke.

6. The method of claim 5, wherein step II) includes sub-steps of:
   calculating an included angle between the handwriting vector and the standard vector; and
   determining that the handwriting vector is different from the standard vector in direction when the included angle is larger than a threshold angle.

7. The method of claim 1, further comprising, prior to step a), the steps of:
   controlling, by the processor, the display unit to display the standard image by sequentially presenting the standard strokes in the standard order;
   generating, by the touch interface, a plurality of imitating data sets in response to user input of a plurality of user-imitating strokes, respectively;

generating, by the processor, a plurality of imitating strokes according to the imitating data sets, respectively;

determining, by the processor, whether the imitating strokes conform with the standard strokes, respectively; and when it is determined that at least one of the imitating strokes does not conform with the respective one of the standard strokes in one of direction and length, controlling, by the processor, the display unit to display a notification of an error in at least one imitating stroke.

8. An electronic device for facilitating handwriting practice, comprising:

a processor;

a data storage coupled to said processor and storing at least one standard image associated with a standard word character, the standard word character being composed by a number of standard strokes and having a boundary that passes through an upmost point, a lowermost point, a leftmost point and a rightmost point of the standard word character;

a touch interface coupled to said processor, said touch interface being programmed to generate a plurality of handwriting data sets in response to user input of a number N of user-writing strokes of an intended word character, respectively; and a display unit coupled to said processor, wherein said processor is programmed to:

generate a number N of handwriting strokes according to the handwriting data sets, respectively, the handwriting strokes composing a handwriting word character;

generate an input image that includes the handwriting word character, that has a boundary passing through an upmost point, a lowermost point, a leftmost point and a rightmost point of the handwriting word character, and that has a shape similar to a shape of the standard image stored in the data storage;

scale the input image to generate a scaled image with a size that is the same as a size the standard image;

overlap the standard image and the scaled image;

define an acceptance region for each of the standard strokes;

determine whether an $n^{th}$ one of the handwriting strokes in the scaled image corresponds in position to the acceptance region that covers a corresponding one of the standard strokes in the standard image that has an $n^{th}$ position in a standard order of the standard word character, where n is an integral variable ranging from 1 to N; and when it is determined that any one of the handwriting strokes does not correspond in position to the acceptance regions of the corresponding one of the standard strokes, control said display unit to display a notification of a stroke order error in the handwriting word character to notify that the user-writing strokes were not inputted in the standard order, wherein said processor is further programmed to, for each of the handwriting strokes:

compare the handwriting stroke with the acceptance region to determine whether the handwriting stroke has an out-of-bound part that is out of the acceptance region;

when it is determined that the handwriting stroke has an out-of-bound part, calculate an out-of-bound area indicating an area of the out-of-bound part, and a ratio of the out-of-bound area to an acceptance area of the acceptance region; and determine that the stroke order does not conform with the standard order when the ratio is larger than a threshold ratio.

9. The electronic device of claim 8, wherein, for each of the standard strokes, the acceptance region defined by said processor has a boundary passing through an upmost point, a lowermost point, a leftmost point and a rightmost point of the standard stroke.

10. The electronic device of claim 8, each of the standard strokes having a standard length, wherein said processor is further programmed, for each of the handwriting strokes, to:

calculate a writing length of the handwriting stroke according to the respective one of the handwriting data sets;

compare the writing length of the handwriting stroke with the standard length of the corresponding one of the standard strokes; and when the writing length of the handwriting stroke is different from the standard length, control said display unit to display a notification of a length error in the handwriting stroke.

11. The electronic device of claim 10, wherein in comparing the writing length of the handwriting stroke with the standard length of the corresponding one of the standard strokes, said processor is programmed to:

calculate a difference between the writing length and the standard length;

calculate a ratio of the difference to the standard length; and determine that the writing length of the handwriting stroke is different from the standard length when the ratio is larger than a threshold ratio.

12. The electronic device of claim 8, each of the standard strokes having a starting point, a finish point, and a standard vector starting from the starting point to the finish point, wherein said processor is further programmed, for each of the handwriting strokes, to:

define a starting point and a finish point of the handwriting stroke, and a handwriting vector starting from the starting point to the finish point according to the respective one of the handwriting data sets;

compare the handwriting vector to the standard vector; and when the handwriting vector is different from the standard vector in direction, control said display unit to display a notification of a direction error in the handwriting stroke.

13. The electronic device of claim 12, wherein in comparing the handwriting vector to the standard vector, said processor is programmed to:

calculate an included angle between the handwriting vector and the standard vector; and determine that the handwriting vector is different from the standard vector in direction when the included angle is larger than a threshold angle.

14. The electronic device of claim 8, wherein said processor is further programmed to:

control said display unit to display the standard image by sequentially presenting the standard strokes in the standard order;

said touch interface is programmed to generate a plurality of imitating data sets in response to user input of a plurality of user-imitating strokes, respectively;

said processor is further programmed to generate a plurality of imitating strokes according to the imitating data sets, respectively, to determine whether the imitating strokes conform with the standard strokes, respectively, and when it is determined that at least one of the imitating strokes does not conform with the respective one of the standard strokes in one of direction and length, to control said display unit to display a notification of an error in at least one imitating stroke.

\* \* \* \* \*